US011496883B2

(12) United States Patent
Lee et al.

(10) Patent No.: US 11,496,883 B2
(45) Date of Patent: **\*Nov. 8, 2022**

(54) APPARATUS AND METHOD FOR ACCESS CONTROL ON ESIM

(71) Applicant: Samsung Electronics Co., Ltd., Gyeonggi-do (KR)

(72) Inventors: Hyewon Lee, Seoul (KR); Duckey Lee, Seoul (KR); Sujung Kang, Gyeonggi-do (KR); Youngsun Ryu, Gyeonggi-do (KR); Jonghan Park, Gyeonggi-do (KR); Kangjin Yoon, Seoul (KR)

(73) Assignee: Samsung Electronics Co., Ltd

( * ) Notice: Subject to any disclaimer, the term of this patent is extended or adjusted under 35 U.S.C. 154(b) by 0 days.

This patent is subject to a terminal disclaimer.

(21) Appl. No.: 16/983,407

(22) Filed: Aug. 3, 2020

(65) Prior Publication Data

US 2020/0367049 A1 Nov. 19, 2020

Related U.S. Application Data

(63) Continuation of application No. 15/895,725, filed on Feb. 13, 2018, now Pat. No. 10,735,945.

(30) Foreign Application Priority Data

Feb. 13, 2017 (KR) ........................ 10-2017-0019257

(51) Int. Cl.
*H04M 1/66* (2006.01)
*H04W 8/20* (2009.01)
(Continued)

(52) U.S. Cl.
CPC ........... *H04W 8/205* (2013.01); *H04L 9/3247* (2013.01); *H04L 9/3271* (2013.01); *H04W 8/183* (2013.01);
(Continued)

(58) Field of Classification Search
CPC ... H04L 9/3247; H04L 9/3249; H04L 9/3252; H04L 9/3255; H04L 9/3257;
(Continued)

(56) References Cited

U.S. PATENT DOCUMENTS 8,825,009 B2 9/2014 Breuer et al.
9,049,596 B1 6/2015 Kronrod
(Continued)

FOREIGN PATENT DOCUMENTS

CN 102016865 4/2011
CN 102016867 4/2011
(Continued)

OTHER PUBLICATIONS

International Search Report dated May 23, 2018 issued in counterpart application No. PCT/KR2018/001896, 3 pages.
(Continued)

*Primary Examiner* — Huy C Ho
(74) *Attorney, Agent, or Firm* — The Farrell Law Firm, P.C.

(57) ABSTRACT

The present disclosure relates to a communication technique that combines a 5G communication system for supporting a data rate that is higher than that of a beyond 4G system with IoT technology, and a system thereof. The present disclosure may be applied to intelligent services on the basis of 5G communication technology and IoT related technology, such as smart home, smart building, smart city, smart car or connected car, health care, digital education, retail, security and safety related services. More specifically, the present disclosure relates to an apparatus and a method in which a terminal performs communication connection by downloading and installing a communication service in a communication system.

20 Claims, 19 Drawing Sheets

(51) Int. Cl.
  *H04L 9/32* (2006.01)
  *H04W 8/18* (2009.01)
  *H04W 12/06* (2021.01)
  *H04W 12/30* (2021.01)
  *H04W 12/069* (2021.01)
  *H04W 12/0431* (2021.01)
  *H04W 4/50* (2018.01)
  *H04W 12/04* (2021.01)

(52) U.S. Cl.
  CPC ....... *H04W 12/0431* (2021.01); *H04W 12/06* (2013.01); *H04W 12/069* (2021.01); *H04W 12/35* (2021.01); *H04L 2209/80* (2013.01); *H04W 4/50* (2018.02); *H04W 12/04* (2013.01)

(58) Field of Classification Search
  CPC ... H04L 9/3263; H04L 9/3265; H04L 9/3268; H04L 9/3271; H04L 9/3273; H04L 9/3278; H04L 9/38; H04L 2463/00; H04L 2463/041; H04L 2463/061; H04L 2463/062; H04L 2463/081; H04L 2463/082; H04W 8/183; H04W 12/06; H04W 4/50; H04W 12/04; H04W 8/205
  USPC ........................................................ 455/411
  See application file for complete search history.

(56) References Cited

U.S. PATENT DOCUMENTS

| | | |
|---|---|---|
| 2004/0229601 A1 | 11/2004 | Zabawskyi et al. |
| 2009/0249065 A1 | 10/2009 | De Atley et al. |
| 2009/0254753 A1 | 10/2009 | De Atley et al. |
| 2012/0190354 A1 | 7/2012 | Merrien et al. |
| 2012/0260090 A1 | 10/2012 | Hauck et al. |
| 2014/0073292 A1 | 3/2014 | Kim et al. |
| 2014/0310777 A1 | 10/2014 | Truskovsky et al. |
| 2015/0296379 A1 | 10/2015 | Nix |
| 2015/0303966 A1 | 10/2015 | Lee et al. |
| 2015/0312699 A1 | 10/2015 | Rodgers et al. |
| 2016/0212253 A1 | 7/2016 | Akama et al. |
| 2016/0277930 A1 | 9/2016 | Li et al. |
| 2018/0103335 A1 | 4/2018 | Bruner |
| 2018/0123803 A1 | 5/2018 | Park et al. |
| 2018/0302781 A1 | 10/2018 | Lee |
| 2019/0140837 A1* | 5/2019 | Cheng ................ H04W 12/106 |
| 2019/0373448 A1* | 12/2019 | Gao ...................... H04W 8/205 |

FOREIGN PATENT DOCUMENTS

| | | |
|---|---|---|
| CN | 105323323 | 2/2016 |
| CN | 105493530 | 4/2016 |
| EP | 3 297 309 | 3/2018 |
| WO | WO 2016/167551 | 10/2016 |
| WO | WO 2016/178548 | 11/2016 |

OTHER PUBLICATIONS

V2 GSMA: "GSM Association, Non-Confidential Official Document SGP.21—RSP Architecture Security Classification: Non-Confidential", Version 2.0, Aug. 23, 2016, 94 pages.

European Search Report dated Sep. 10, 2020 issued in counterpart application No. 18751809.7-1212, 8 pages.

LG Electronics et al., Handling of Application Specific Congestion Control for Data Communication (ACDC), C1-153219, 3GPP TSG-CT WG1 Meeting #93, Aug. 17-21, 2015, 55 pages.

Chinese Office Action dated Jan. 4, 2022 issued in counterpart application No. 201880004652.9, 12 pages.

* cited by examiner

APPARATUS AND METHOD FOR ACCESS CONTROL ON ESIM

CROSS-REFERENCE TO RELATED APPLICATION(S)

This application is a continuation of U.S. application Ser. No. 15/895,725, which was filed in the U.S. Patent and Trademark Office on Feb. 13, 2018, and claims priority under 35 U.S.C. § 119 to Korean Patent Application Serial No. 10-2017-0019257, which was filed in the Korean Patent Office on Feb. 13, 2017, the entire disclosure of each of which is incorporated herein by reference in its entirety.

BACKGROUND

Field

The present disclosure relates generally to an apparatus and a method for communication connection in a communication system by downloading and installing a communication service onto a terminal, and more particularly, to an apparatus and a method for downloading, installing, and managing a profile online in a communication system.

Description of Related Art

In order to meet the demand for wireless data traffic that is on an increasing trend after commercialization of 4G communication systems, efforts have been made to develop improved 5G or pre-5G communication system. For this reason, the 5G or pre-5G communication system is also called a beyond 4G network communication system or a post LTE system.

In order to achieve high data rate, implementation of a 5G communication system in an ultrahigh frequency (mmWave) band (e.g., like 60 GHz band) has been considered. In order to mitigate a path loss of radio waves and to increase a transfer distance of the radio waves in the ultrahigh frequency band, technologies of beamforming, massive MIMO, full dimension MIMO (FD-MIMO), array antennas, hybrid beamforming, and large scale antennas for the 5G communication system have been discussed.

Further, for system network improvement in the 5G communication system, technology developments have been made for an evolved small cell, advanced small cell, cloud radio access network (cloud RAN), ultra-dense network, device to device communication (D2D), wireless backhaul, moving network, cooperative communication, coordinated multi-points (CoMP), and reception interference cancellation.

In addition, in the 5G system, hybrid FSK and QAM modulation (FQAM) and sliding window superposition coding (SWSC), which correspond to advanced coding modulation (ACM) systems, and filter bank multicarrier (FBMC), non-orthogonal multiple access (NOMA), and sparse code multiple access (SCMA), which correspond to advanced connection technologies, have been developed.

On the other hand, the Internet, which is a human centered connectivity network where humans generate and consume information, is now evolving to the Internet of things (IoT) where distributed entities, such as things, exchange and process information. The Internet of everything (IoE), which is a combination of the IoT technology and big data processing technology through connection with a cloud server, has emerged. As technology elements, such as sensing technology, wired/wireless communication and network infrastructure, service interface technology, and security technology, have been demanded for IoT implementation, a sensor network for machine-to-machine connection, machine-to-machine (M2M) communication, machine type communication (MTC), and so forth have been recently researched. Such an IoT environment may provide intelligent Internet technology (IT) services that create a new value to human life by collecting and analyzing data generated among connected things. The IoT may be applied to a variety of fields including smart home, smart building, smart city, smart car or connected cars, smart grid, health care, smart appliances and advanced medical services through convergence and combination between the existing information technology (IT) and various industries.

Accordingly, various attempts have been made to apply the 5G communication system to IoT networks. For example, technologies of sensor network, machine to machine (M2M) communication, and MTC have been implemented by techniques for beam-forming, MIMO, and array antennas, which correspond to the 5G communication technology. As the big data processing technology as described above, application of a cloud radio access network (RAN) would be an example of convergence between the 5G technology and the IoT technology.

A universal integrated circuit card (UICC) is a smart card that may be inserted into a mobile communication terminal or the like. The UICC may include an access control module for accessing a network of a mobile communication service provider. Examples of an access control module include a universal subscriber identity module (USIM), a subscriber identity module (SIM), and an Internet protocol (IP) multimedia service identity module (ISIM). A UICC including a USIM may be referred to as a USIM card. Similarly, a UICC including a SIM module may be referred to as a SIM card. Herein, a SIM card will be assumed to include the UICC card, the USIM card, and the UICC including the ISIM. However, although the SIM card is described, the technical characteristic thereof may also be applied to the USIM card, the ISIM card, or a general UICC card in the same manner.

The SIM card stores personal information of a mobile communication subscriber, and allows the subscriber to use safe mobile communications by performing subscriber authentication and traffic security key generation during accessing to a mobile communication network.

In general, a SIM card is manufactured as a dedicated card for a specific mobile communication service provider during manufacturing of the card, and authentication information for accessing a network of the corresponding service provider, e.g., a USIM application (app) and IMSI, a K value (a subscriber key), and an OPc value (an operator variant algorithm configuration value), is embedded in advance in the card before shipping. Accordingly, the manufactured SIM card is delivered to the corresponding mobile communication service provider, and is then provided by the mobile communication service provider to the subscriber. Thereafter, if needed, management, such as installation, correction, and deletion, of applications in the UICC may be performed using technology, such as over-the-air (OTA). The subscriber can use the network and application services of the corresponding mobile communication service provider by inserting the UICC card into a subscriber's mobile communication terminal.

When subscriber replaces the terminal, the UICC card may be removed from the existing terminal and inserted into a new terminal, thereby allowing the new terminal to use the authentication information, mobile communication phone number, personal phonebook, etc., stored in the UICC card.

However, the SIM card is inconvenient to use when a mobile communication terminal user want to change service providers, i.e., receive a service from a new mobile communication service provider, because the user must physically acquire a new SIM card for the service from the new mobile communication service provider. For example, when traveling to a new country, the terminal user should purchase a local SIM card in order to receive the local mobile communication service in the new country. Although a roaming service may somewhat solve the problem of inconvenience, the user may be unable to or not want to receive the roaming service due to expensive fees or nonexistent agreement between communication service providers.

However, when a SIM module is remotely downloaded and installed in a UICC card, the problem as described above can be addressed. That is, the user can download a new SIM module for the mobile communication service desired to be used into the UICC card at a desired time. A plurality of SIM modules may be downloaded and installed in the UICC card, and one of the downloaded SIM modules may be selected to be used. The UICC card may be or may not be fixed to the terminal.

In particular, a UICC that is fixed to a terminal is commonly referred to as an embedded UICC (eUICC). Herein, an eUICC refers to a UICC card, which is normally fixed within a terminal, and can remotely download and select a SIM module. That is, a UICC card that is fixed within or is not fixed within the terminal and is capable of remotely downloading and selecting a SIM module is referred to as the eUICC. Further, downloaded SIM module information may be referred to as an eUICC profile or a profile.

A terminal may include software that controls the eUICC operation, e.g., operating to download, select, or delete an eUICC profile. Herein, such software may be referred to as a local profile assistant (LPA), which may be unique software that controls the eUICC by receiving an input from other software included in the terminal.

SUMMARY

An aspect of the present disclosure is to provide an apparatus and a method for a terminal to perform a communication connection using a selected communication service in a communication system.

Another aspect of the present disclosure is to provide an apparatus and a method for a terminal to download, install, and manage a profile for a communication connection in a communication system.

Another aspect of the present disclosure is to provide an apparatus and a method for efficiently controlling access of terminal software to an eUICC in a communication system.

In accordance with an aspect of the present disclosure, a method is provided for a universal integrated circuit card (UICC) included in a terminal in a wireless communication system. The method includes receiving, from a local profile assistant (LPA) installed in the terminal, a first function call associated with a challenge of the UICC, the first function call being received based on a first request from an application installed in the terminal; transmitting, to the LPA, the challenge generated based on the first function call; receiving, from the LPA, a second function call associated with a signature of a server, wherein the second function call includes the signature of the server generated for the challenge and is received based on a second request from the application; and verifying the signature of the server.

In accordance with another aspect of the present disclosure, a method is provided for a terminal including a universal integrated circuit card (UICC), the terminal having an application and a local profile assistant (LPA) installed therein in a wireless communication system. The method includes receiving, from the application by the LPA, a first request for a challenge of the UICC; receiving, from the LPA by the UICC, a first function call associated with the challenge of the UICC; transmitting, to the LPA by the UICC, the challenge generated based on the first function call; transmitting, to a server by the application, a first message including the challenge; receiving, from the server by the application, a second message including a signature of the server generated for the challenge; receiving, from the LPA by the UICC, a second function call including the signature of the server; and validating, by the UICC, the signature of the server.

In accordance with another aspect of the present disclosure, a universal integrated circuit card (UICC) is provided in a terminal in a wireless communication system. The UICC is configured to receive, from a local profile assistant (LPA) installed in the terminal, a first function call associated with a challenge of the UICC, the first function call being received based on a first request from an application installed in the terminal, transmit, to the LPA, the challenge generated based on the first function call, receive, from the LPA, a second function call associated with a signature of a server, wherein the second function call includes the signature of the server generated for the challenge and is received based on a second request from the application, and verify the signature of the server.

In accordance with another aspect of the present disclosure, a terminal is included a universal integrated circuit card (UICC), wherein the terminal has an application and a local profile assistant (LPA) installed therein in a wireless communication system. The terminal includes a transceiver configured to transmit and receive a signal; and a controller configured to receive, from the application by the LPA, a first request for a challenge of the UICC, receive, from the LPA by the UICC, a first function call associated with the challenge of the UICC, transmit, to the LPA by the UICC, the challenge generated based on the first function call, transmit, to a server by the application, a first message including the challenge, receive, from the server by the application, a second message including a signature of the server generated for the challenge, receive, from the LPA by the UICC, a second function call including the signature of the server, and validate, by the UICC, the signature of the server.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
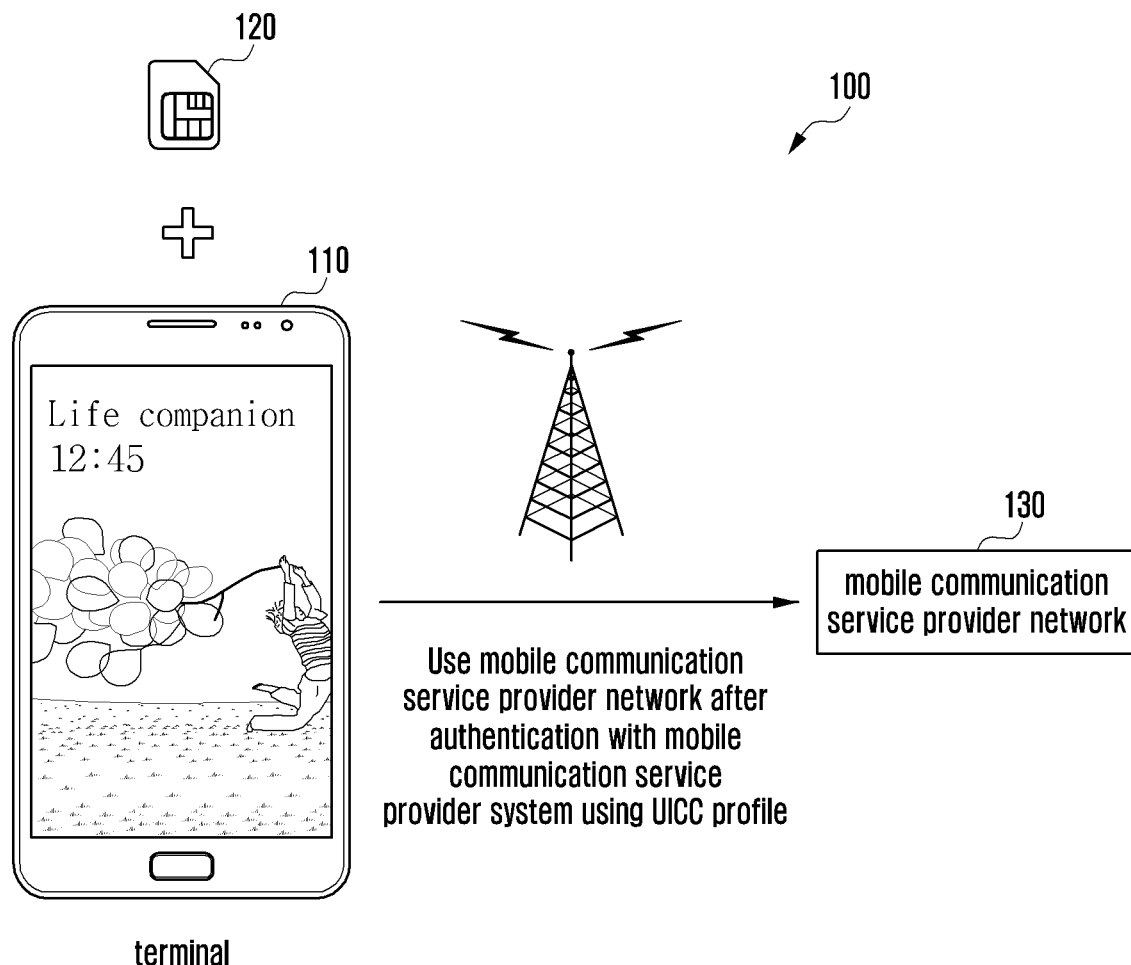
FIG. 1 illustrates a method for a terminal to connect to a mobile communication network using a UICC embedded with a fixed profile.

Various embodiments of the present disclosure will be described below in detail with reference to the accompanying drawings. In the following description, specific details such as detailed configuration and components are merely provided to assist the overall understanding of these embodiments of the present disclosure. Therefore, it should be apparent to those skilled in the art that various changes and modifications of the embodiments described herein can be made without departing from the scope and spirit of the present disclosure. In addition, descriptions of well-known functions and constructions are omitted for clarity and conciseness.

In the accompanying drawings, some elements are exaggerated, omitted, or roughly illustrated. Further, sizes of the illustrated elements may not completely reflect the actual sizes thereof. Additionally, the same or similar drawing reference numerals may be used for the same or similar elements across various figures.

Each block or step of the flowchart illustrations, and combinations of the blocks or steps in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create a device for implementing the functions specified in the flowchart blocks or steps. The computer program instructions may be stored in a computer-usable or computer-readable memory that can direct a computer or another programmable data processing apparatus to function in a particular manner, such that the instructions stored in the computer-usable or computer-readable memory produce an article of manufacture including instruction means that implement the function specified in the flowchart blocks or steps. The computer program instructions may also be loaded onto a computer or other programmable data processing apparatus to instruct a series of operational steps to be performed on the computer or other programmable apparatus to produce a computer implemented process such that the instructions that execute on the computer or other programmable apparatus provide steps for implementing the functions specified in the flowchart blocks or steps.

Each block or step of the flowchart illustrations may represent a module, segment, or portion of code, which comprises one or more executable instructions for implementing the specified logical function(s). In some alternative implementations, the functions noted in the blocks or steps may occur in a different order. For example, two blocks or steps shown in succession may in fact be executed substantially concurrently or in a reverse order, depending upon the functionality involved.

Herein, the term "unit" may refer to a software or hardware component, such as a field-programmable gate array (FPGA) or an application-specific integrated circuit (ASIC), which performs certain tasks. However, "unit" does not necessarily refer to software or hardware. A "unit" may advantageously be configured to reside on the addressable storage medium and configured to execute on one or more processors. Thus, a "unit" may include software components, object-oriented software components, class components and task components, processes, functions, attributes, procedures, subroutines, segments of program code, drivers, firmware, microcode, circuitry, data, databases, data structures, tables, arrays, variables, etc. The functionality provided for in the components and "units" may be combined into fewer components and "units" or further separated into additional components and "units". Further, the components and "units" may be implemented to operate one or more central processing units (CPUs) in a device or a security multimedia card. Further, a "unit" may include one or more processors.

Specific terms used in the following description are provided to help understanding of the present disclosure, and may be modified in different forms within a range that does not deviate from the technical idea of the present disclosure.

Herein, a UICC is a smart card that may be inserted into a mobile communication terminal, and the UICC stores personal information, such as network access authentication information of a mobile communication subscriber, a phonebook, and a short messaging service (SMS), and can safely use the mobile communication by performing subscriber authentication and traffic security key generation when accessing a mobile communication network, such as Global System for Mobile communication (GSM), Wideband Code Division Multiplexing Access (WCDMA), and LTE.

In the UICC, communication applications, such as a SIM, a USIM, and an ISIM, are embedded in accordance with the type of the mobile communication network accessed by the subscriber, and the UICC may provide an upper-level security function for embedding of various applications, such as an e-wallet application, a ticketing application, and an e-passport application.

An eUICC is a chip type security module which is embedded in (or fixed within) the terminal. The eUICC may download and install a profile using an OTA technique. The eUICC may be referred to as a UICC in which a profile download and installation can be performed.

In the disclosure, a method for downloading and installing a profile in the eUICC using the OTA technique may be applied to a detachable type UICC that can be inserted into or detached from the terminal. That is, an embodiment of the present disclosure, which is described with reference to an eUICC, may also be applied to a UICC that is capable of downloading and installing a profile using the OTA technique.

Herein, the term "UICC" may be interchangeably used with SIM, and the term "eUICC" may be interchangeably used with eSIM.

Herein, the profile may refer the packaging of an application, a file system, and an authentication key value stored in the UICC in the form of software.

A "USIM profile" may have the same meaning as a "profile", or may mean the packaging of information included in the USIM application in the profile in the form of software.

A profile providing server may generate a profile, encrypt the generated profile, generate a remote profile management command, and/or encrypt the generated remote profile management command. The profile providing server may also be referred to as a subscription manager data preparation (SM-DP) a subscription manger data preparation plus (SM-DP+), an off-card entity of profile domain, a profile encryption server, a profile generation server, a profile provisioner (PP), a profile provider, or a profile provisioning credentials holder (PPC holder).

A profile management server may be referred to as a subscription manager secure routing (SM-SR), a subscription manger secure routing plus (SM-SR+), an off-card entity of eUICC profile manager, a profile management credentials (PMC) holder, or an eUICC manager (EM).

A profile providing server may also include the functionality of the profile management server. Accordingly, in accordance with various embodiments of the present disclosure, it is also possible that the operations of the profile providing server are performed by the profile management server. It is also possible the operations described with respect to the profile management server or SM-SR may be performed by the profile providing server.

Herein, a terminal may include a mobile station (MS), a user equipment (UE), a user terminal (UT), a wireless terminal, an access terminal (AT), a subscriber unit, a subscriber station (SS), a wireless device, a wireless communication device, a wireless transmit/receive unit (WTRU), a moving node, a mobile device, a cellular phone, a smart phone, a personal digital assistant (PDA), a wireless modem, a portable computer, an imaging device, such as a digital camera, a gaming device, a music storage and reproduction device, an Internet home appliance, or a portable unit or terminal integrating combinations of such functions.

Further, the terminal may include an M2M terminal, or MTC terminal/device, but is not limited thereto.

The terminal may also be referred to as an electronic device.

Herein, a UICC capable of downloading and installing a profile may be embedded in the electronic device (e.g., an eUICC), or may be physically separable from the electronic device. For example, a card type UICC may be inserted into the electronic device. The electronic device may include the terminal, and the terminal may include a UICC configured to download and install a profile.

The terminal or the electronic device may include first software or an application installed therein to control the UICC or the eUICC. The first software or the application may be referred to as an LPA.

The terminal or the electronic device may include second software or an application that is permitted to access to the LPA. The second software or the application may be referred to as a service provider app.

The service provider app may pre-include an access address of a specific server. The server configured to be accessed by the service provider app may be referred to as a service provider server.

The terminal or the electronic device may include third software or an application that is not permitted to access to the LPA. The third software or the application may be referred to as malware.

A profile discriminator may include a profile identifier (ID), an integrated circuit card ID (ICCID), a machine ID, an event ID, an activation code, an activation code token, issuer security domain profile (ISD-P), or a factor matching a profile domain (PD). The profile ID may indicate an inherent identifier of each profile. The profile discriminator may include an address of a profile providing server (e.g., SM-DP+) capable of indexing the profile.

An eUICC ID (EID) may be an inherent identifier of the eUICC embedded in the terminal. Further, if a provisioning profile has already been embedded in the eUICC, the EID may be a profile ID of the corresponding provisioning profile. Further, in accordance with an embodiment of the present disclosure, if the terminal and the eUICC chip are not separated from each other, the EID may be a terminal ID. Further, the EID may be referred to as a specific secure domain of the eUICC chip.

A profile container may include a profile domain or a security domain.

An application protocol data unit (APDU) may be a message for the terminal to interlock with the eUICC. Further, the APDU may be a message for a PP or a profile manager (PM) to interlock with the eUICC.

An event may refer to profile download, remote profile management, or another profile or eUICC management/processing command. The profile download may be interchangeably used with profile installation.

Further, an event type may indicate whether a specific event is a profile download or a remote profile management, or whether the specific event is another profile or eUICC management/processing command. The event type may include an event request type, an event class, or an event request class.

A profile package may be interchangeably used with a profile, or may be used as a term indicating a data object of a specific profile. The profile package may include a profile type, length, and value (TLV) or a profile package TLV. If the profile package is encrypted using an encryption parameter, it may be referred to as a protected profile package (PPP) or a PPP TLV.

If the profile package is encrypted using an encryption parameter that can be decrypted only by a specific eUICC, it may be referred to as a bound profile package (BPP) or a BPP TLV. The profile package TLV may include a data set expressing information that constitutes a profile in a TLV type.

A remote profile management (RPM) may be referred to as a profile remote management, a remote management, a remote management command, a remote command, an RPM package, a profile remote management package, a remote management package, a remote management command package, or a remote command package. The RPM may be used to change the state (e.g., enabled, disabled, or deleted) of a specific profile or to update the contents of a specific profile (e.g., a profile nickname or a profile metadata).

An authentication and key agreement (AKA) may indicate an authentication algorithm for accessing to 3rd Generation Partnership Project (3GPP) and 3GPP2 networks.

Herein, K is an encryption key value stored in the eUICC used for an AKA authentication algorithm, and OPc is a parameter value that can be stored in the eUICC used for the AKA authentication algorithm.

A network access application (NAA) program, such as a USIM or an ISIM, may be stored in the UICC to access the network. The NAA may include a network access module.

FIG. 1 illustrates a method for a terminal to connect to a mobile communication network 100 using a UICC embedded with a profile fixed to the terminal.

Referring to FIG. 1, a UICC 120 may be inserted into a terminal 110. The UICC may be of a detachable type, or may be pre-embedded in the terminal 110. The fixed profile of the UICC embedded with the fixed profile indicates that "access information" for accessing a specific communication service provider is fixed. The access information may include a subscriber discriminator and a K value or a subkey (Ki) value for authentication in the network with the subscriber discriminator.

The terminal 110 may perform authentication with an authentication processing system (e.g., a home location register (HLR) or authentication center (AuC)) of a mobile communication service provider using the UICC. The authentication process may include an AKA process. If the authentication has succeeded, the terminal 110 may use a mobile communication service, such as make a phone call or use mobile data, using a mobile communication network 130 of the mobile communication system.

Figure 2A:
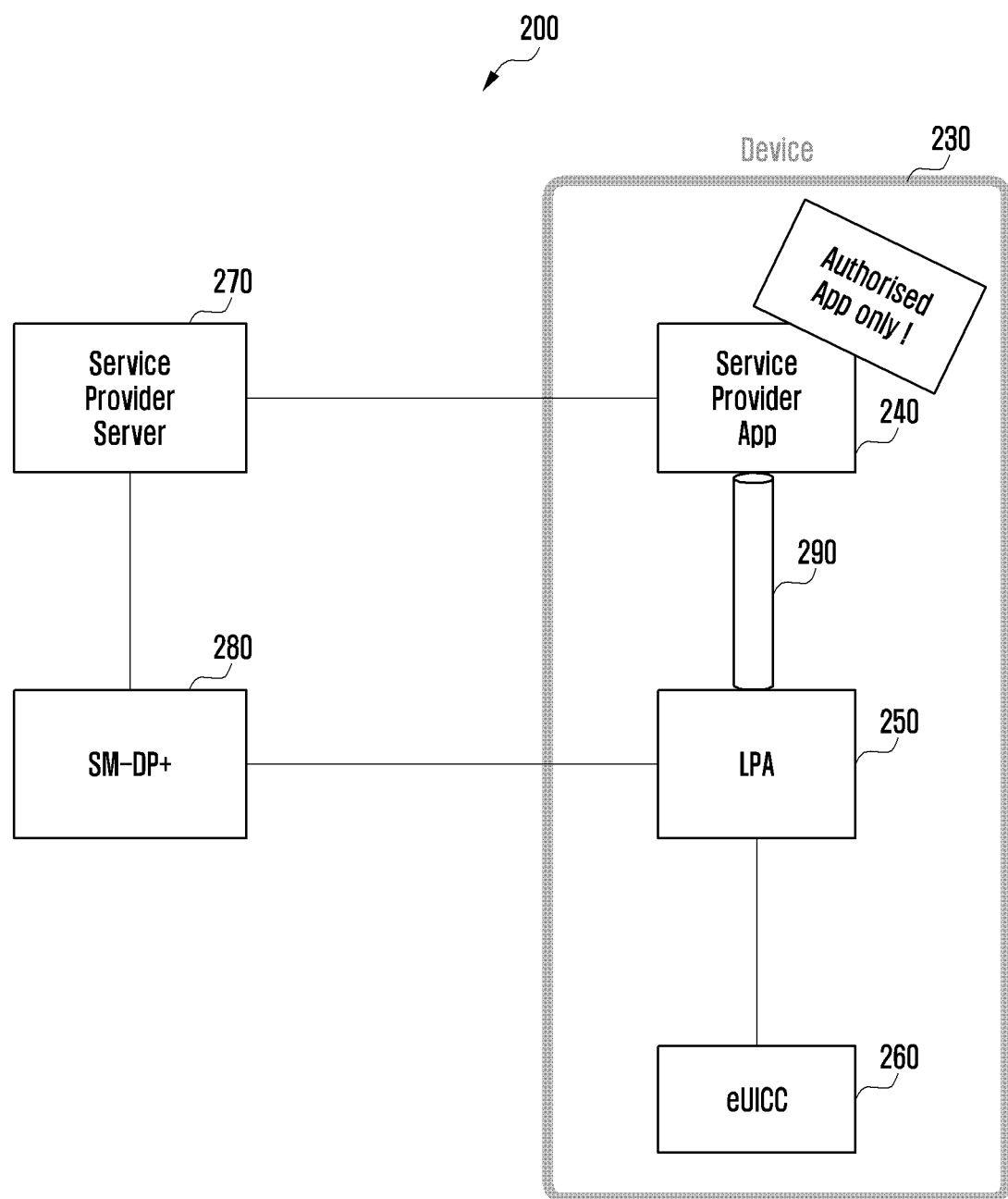
FIGS. 2A and 2B illustrate configurations of a terminal, a profile server, a service provider server, a service provider app, an LPA, and an eUICC, according to an embodiment.
Figure 2B:
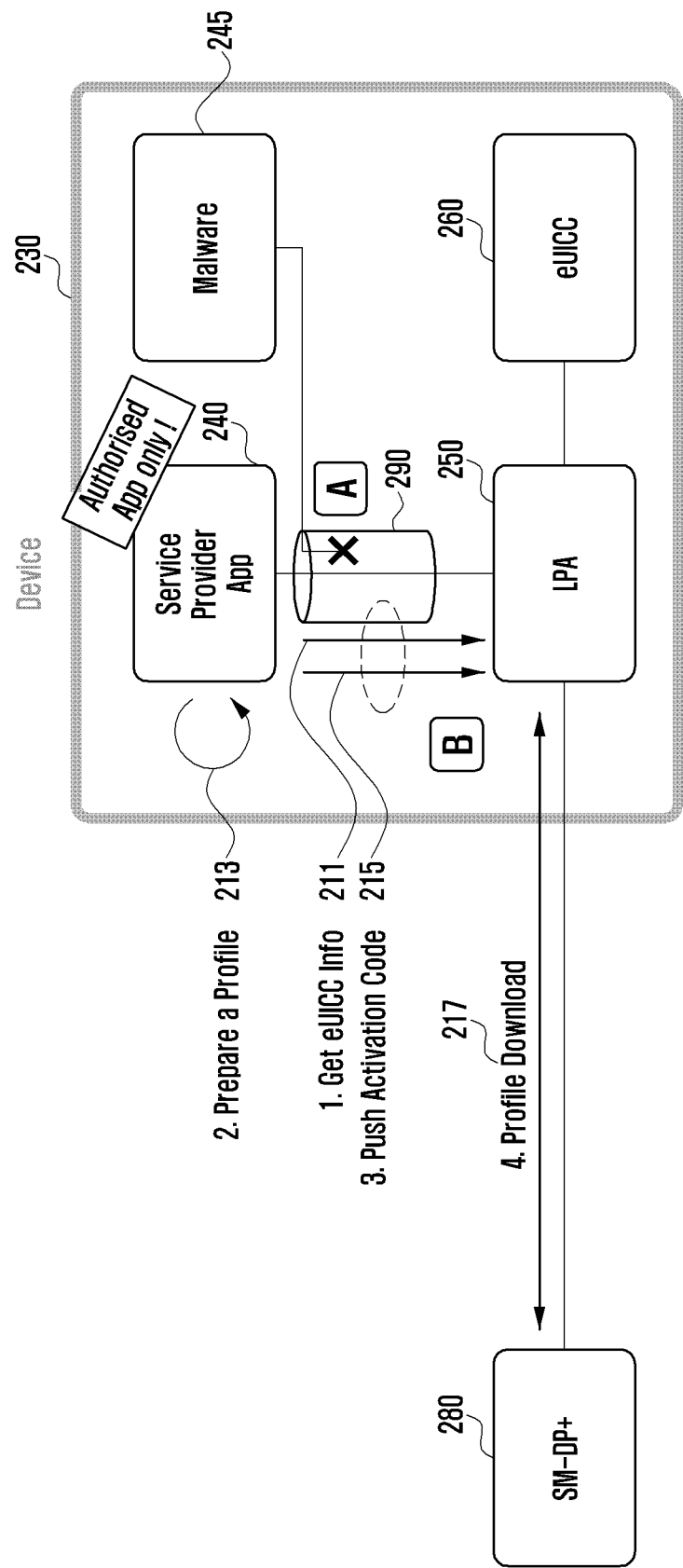

FIGS. 2A and 2B illustrate configurations of a terminal (230), a profile server (280), a service provider server (270), a service provider app (240), malware (245), an LPA (250), and an eUICC (260), according to an embodiment (200).

Referring to FIG. 2A, a terminal 230 includes an LPA 250 connected to a service provider app 240 and an eUICC 260. The connection between the LPA 250 and the service provider app 240 follows a security procedure 290 provided by an operating system (OS) of the terminal 230, fourth software for security, or a physical interface connection. In the security procedure 290, the OS of the terminal 230 verifies a hashing or signing value using a public key or a digital certificate during installation of the software or application, if the hashing or signing value of a program code of the software or application and the public key used for the corresponding hashing or signing or the digital certificate in which the public key is stored are included in the software or application.

The LPA 250 is also connected to a profile server (SM-DP+) 280, e.g., through a transport layer security (TLS) security procedure.

The service provider app 240 is also connected to a service provider server 270. The connection between the service provider app 240 and the service provider server 270 may follow a security procedure optionally selected by a service provider (e.g., a TLS connection or a symmetric key based ciphering method).

Referring to FIG. 2B, in the terminal 230, malware 245, which is third software, is installed, in addition to the LPA 250, which is first software, and the service provider app 240, which is second software. Access to the LPA 250 of the second software 240 or the third software 245 may be permitted B or blocked A, in accordance with the security procedure 290 in the terminal 230.

If access to the LPA 250 by the service provider app 240 is permitted, the service provider app 240, at step 211, transfers a message requesting information of the eUICC 260 (e.g., a size of an available storage space) from the LPA 250. The LPA 250 may read the information of the eUICC 260 and reply to the service provider app 240.

At step 213, the service provider app 240 prepares a profile in a profile server 280 using the acquired information of the eUICC. As the result of the profile preparation, an activation code for profile installation may be generated.

At step 215, the service provider app 240 transfers the generated activation code to the LPA 250.

At step 217, the LPA 250 receives the profile downloaded from the profile server 280 using the received activation code.

According to the above-described procedure, an access control with respect to the LPA of the second or third software should depend on the security procedure 290 in the terminal 230, and it is not possible for the network (e.g., the service provider server 270) to manage the operation in the terminal 230. Further, if access to the LPA 250 is successively made as at steps 211 and 215 in FIG. 2B, the terminal 230 should efficiently process the successive access to improve the performance of the terminal 230.

Figure 3:
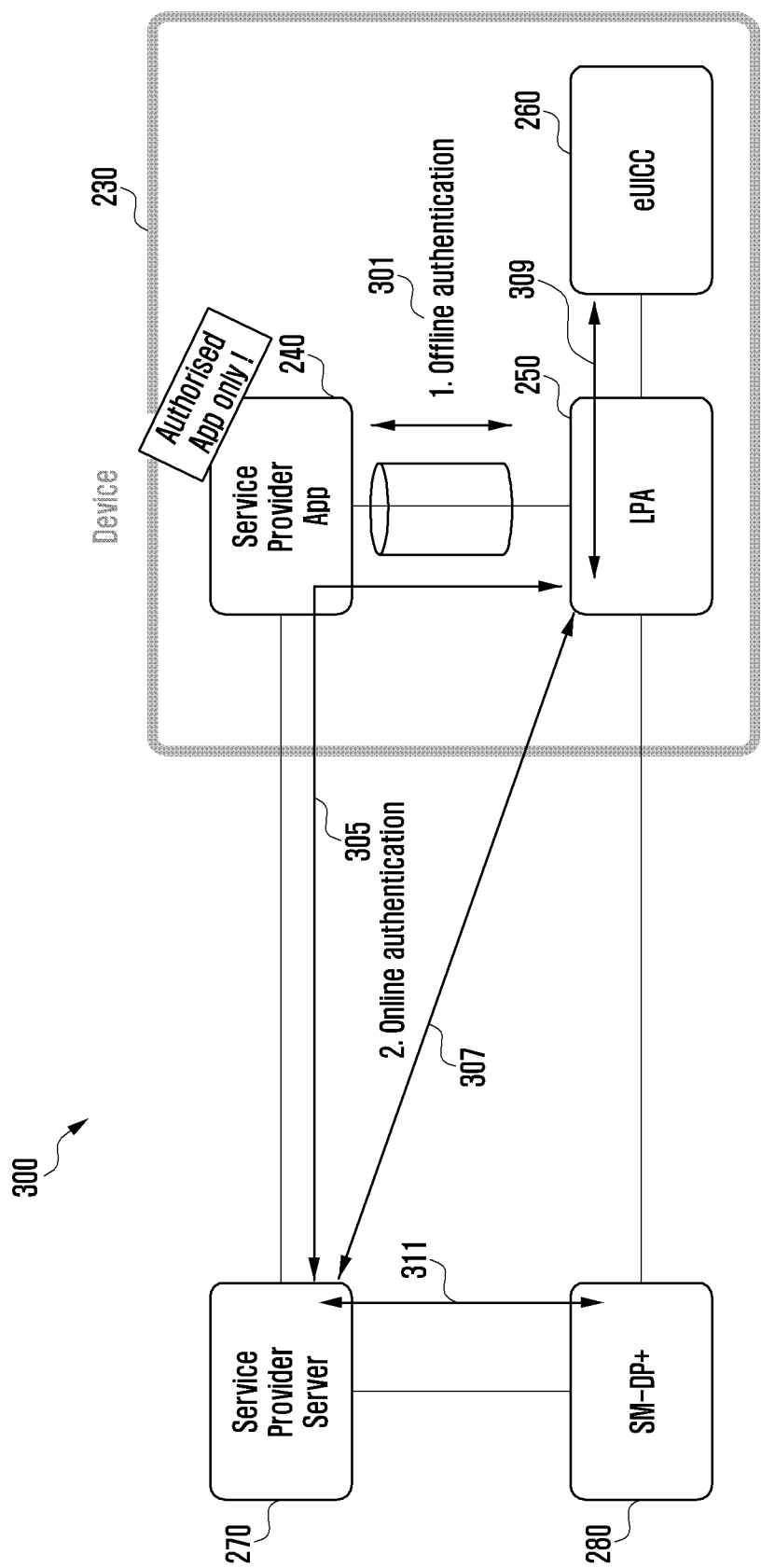
FIG. 3 illustrates a method for performing access authority verification of a service provider app in two stages of offline authentication and online authentication according to an embodiment.

FIG. 3 illustrates a method for performing an access authority verification of a service provider app in two stages of offline authentication and online authentication, according to an embodiment (300).

Referring to FIG. 3, at step 301, the LPA 250 authenticates the service provider app 240 offline. As described above with reference to FIG. 2A, the offline authentication at step 301 may use the function provided by the terminal 230.

At step 305, the LPA 250 authenticates the service provider app 240 online, through the service provider server 270. The online authentication at step 305 may be performed such that the LPA 250 accesses the service provider server 270 through the service provider app 240, or the LPA 250 may directly access the service provider server 270 at step 307 in accordance with the configuration of the LPA 250 or the terminal 230.

Further, the LPA 250 accesses the eUICC 260 at step 309, and the service provider server 270 accesses the profile server 280 at step 311.

Figure 4:
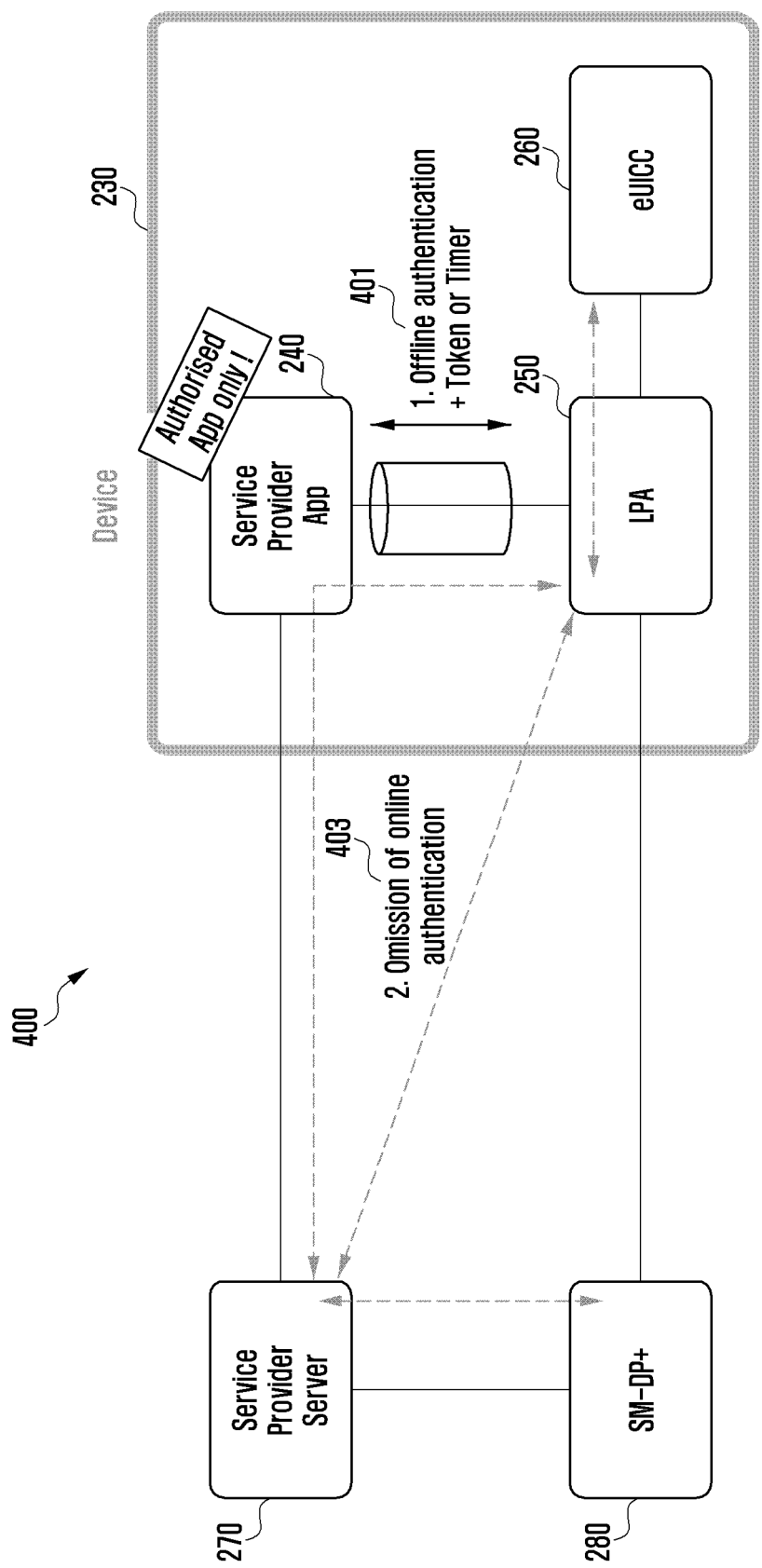
FIG. 4 illustrates a method for omitting an online authentication with respect to verification two or more times, if an access authority of a service provider app is verified multiple times according to an embodiment.

FIG. 4 illustrates a method for omitting an online authentication with respect to verification two or more times, if an access authority of a service provider app is verified multiple times, according to an embodiment (400).

Referring to FIG. 4, the LPA 250 and the service provider app 240 initially verify an access authority to the LPA 250 of the service provider app 240, e.g., in accordance with the procedure of FIG. 3, and if the offline authentication at step 301 and the online authentication at step 303 have succeeded, the LPA 250 operates a timer or issues a token with respect to the service provider app 240.

Thereafter, when re-verifying the access authority to the LPA 250 of the same service provider app 240, the LPA 250, at step 401 for authenticating the service provider app 240 offline, identifies whether the corresponding verification is performed before expiration of the terminal operating during the previous verification or a valid token is used. If the service provider app 240 that has succeeded in the previous verification is performed before the expiration of the timer or the valid token has been used, the LPA 250 may thereafter omit the online authentication at step 403.

Figure 5:
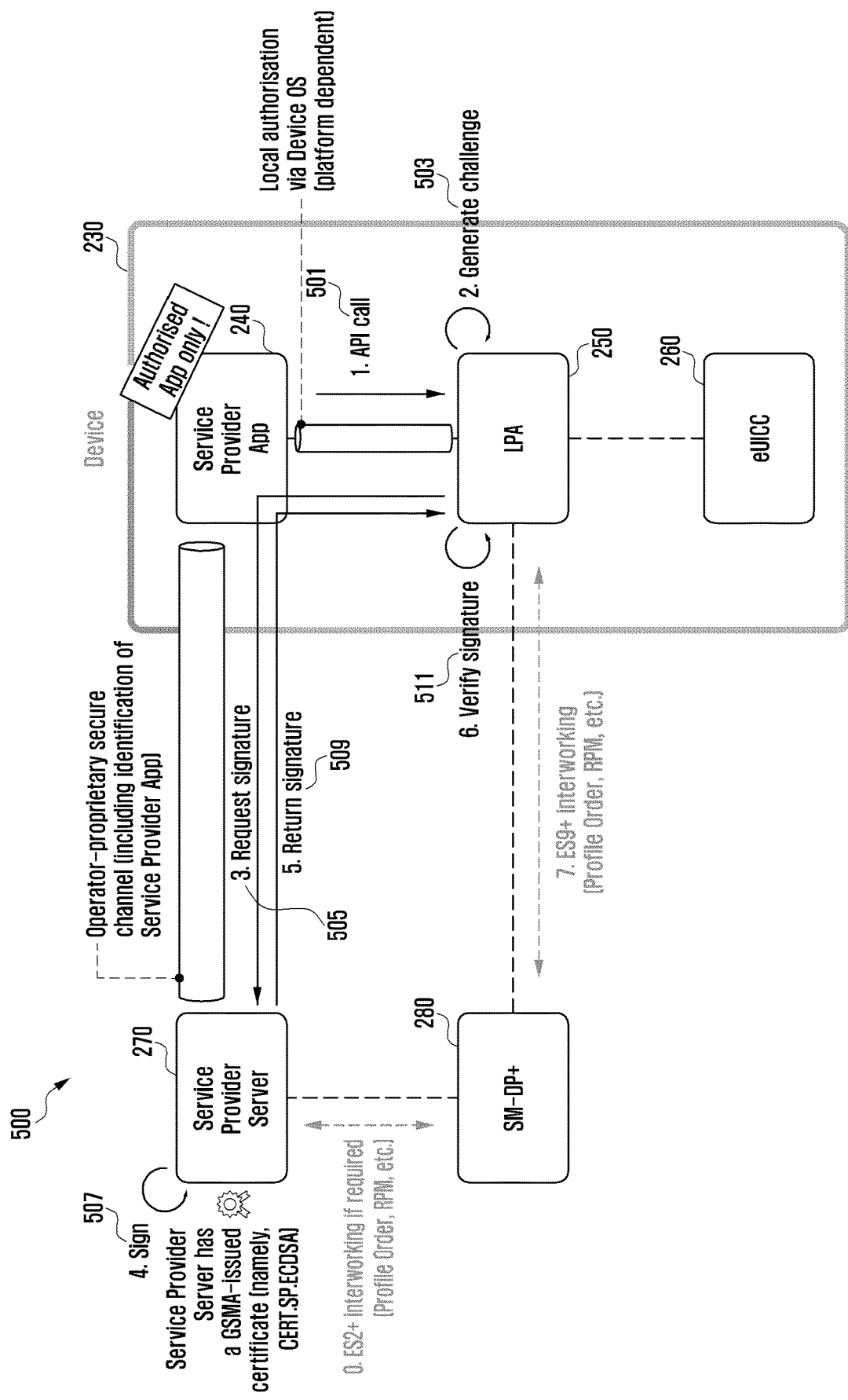
FIG. 5 illustrates an online authentication method in which an LPA accesses a service provider server through a service provider app according to an embodiment.

FIG. 5 illustrates an online authentication method in which an LPA accesses a service provider server through a service provider app to identify the service provider app, according to an embodiment (500).

Referring to FIG. 5, at step 501, the service provider app 240 attempts to call a specific function of the LPA 250. The corresponding access may be transferred to the LPA 250 through the offline authentication at step 301 of FIG. 3, and may use the function provided by the terminal 230 as described above with reference to FIG. 2A.

At step 503, the LPA 250 generates a challenge.

At step 505, the LPA 250 transfers the generated challenge to the service provider server 270 through the service provider app 240 to request a digital signature. An address of the service provider server 270 may be preset in the service provider app 240 or the LPA 250, or may be input from the user.

At step 507, the service provider server 270 performs a digital signature with respect to the received challenge. The digital signature may be performed using a digital certificate pre-stored in the service provider server 270 and a corresponding secret key.

At step 509, the service provider server 270 sends the generated digital signature to the LPA 250 through the service provider app 240, as a reply. The reply may include the digital signature and one or more digital certificates for verifying the digital signature.

At step 511, the LPA 250 attempts to verify the received digital signature. If the digital signature verification has succeeded, the LPA 250 considers that the access authority of the service provider app 240 has been approved, performs the function called by the service provider app 240 (e.g., a profile download from the profile server), and notifies the service provider app 240 or the service provider server 270 of the result of performing the function.

Figure 6:
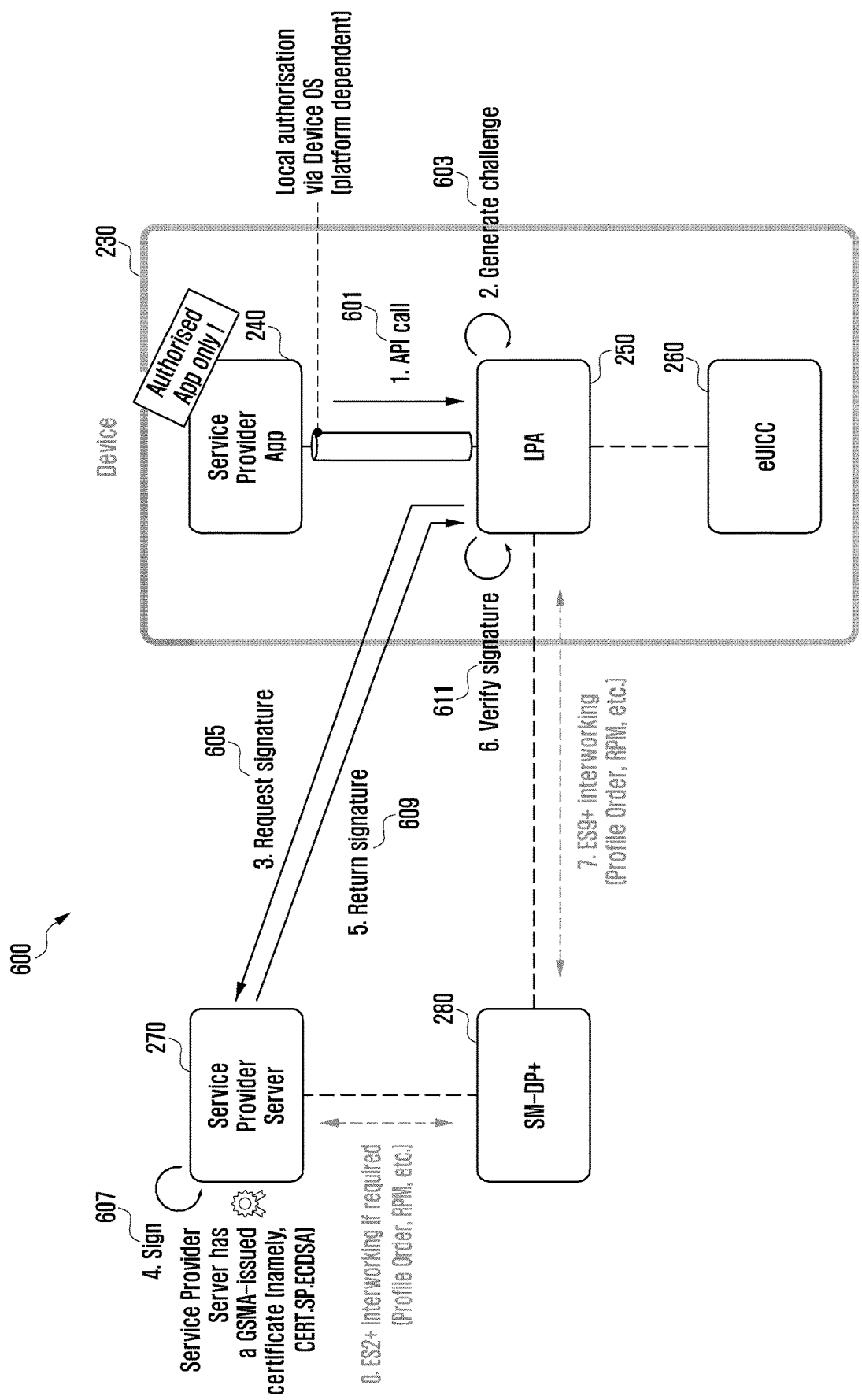
FIG. 6 illustrates an online authentication method in which an LPA directly accesses a service provider server according to an embodiment.

FIG. 6 illustrates an online authentication method in which an LPA directly accesses a service provider server to identify a service provider app, according to an embodiment (600).

Referring to FIG. 6, at step 601, the service provider app 240 attempts to call a specific function of the LPA 250. The corresponding access may be transferred to the LPA 250 through the offline authentication at step 301 of FIG. 3, and may use the function provided by the terminal 230 as described above with reference to FIG. 2A.

At step 603, the LPA 250 generates a challenge.

At step 605, the LPA 250 transfers the generated challenge directly to the service provider server 270 to request a digital signature. An address of the service provider server 270 may be preset in the LPA 250, may be transferred from the service provider app 240 at step 601, or may be input from the user.

At step 607, the service provider server 270 performs a digital signature with respect to the received challenge. The digital signature may be performed using a digital certificate pre-stored in the service provider server 270 and a corresponding secret key.

At step 609, the service provider server 270 directly sends the generated digital signature to the LPA 250 as a reply. The reply may include the digital signature and one or more digital certificates for verifying the digital signature.

At step 611, the LPA 250 attempts to verify the received digital signature. If the digital signature verification has succeeded, the LPA 250 considers that the access authority of the service provider app 240 has been approved, performs the function called by the service provider app 240 (e.g., a profile download from the profile server), and notifies the service provider app 240 or the service provider server 270 of the result of performing the function.

Figure 7:
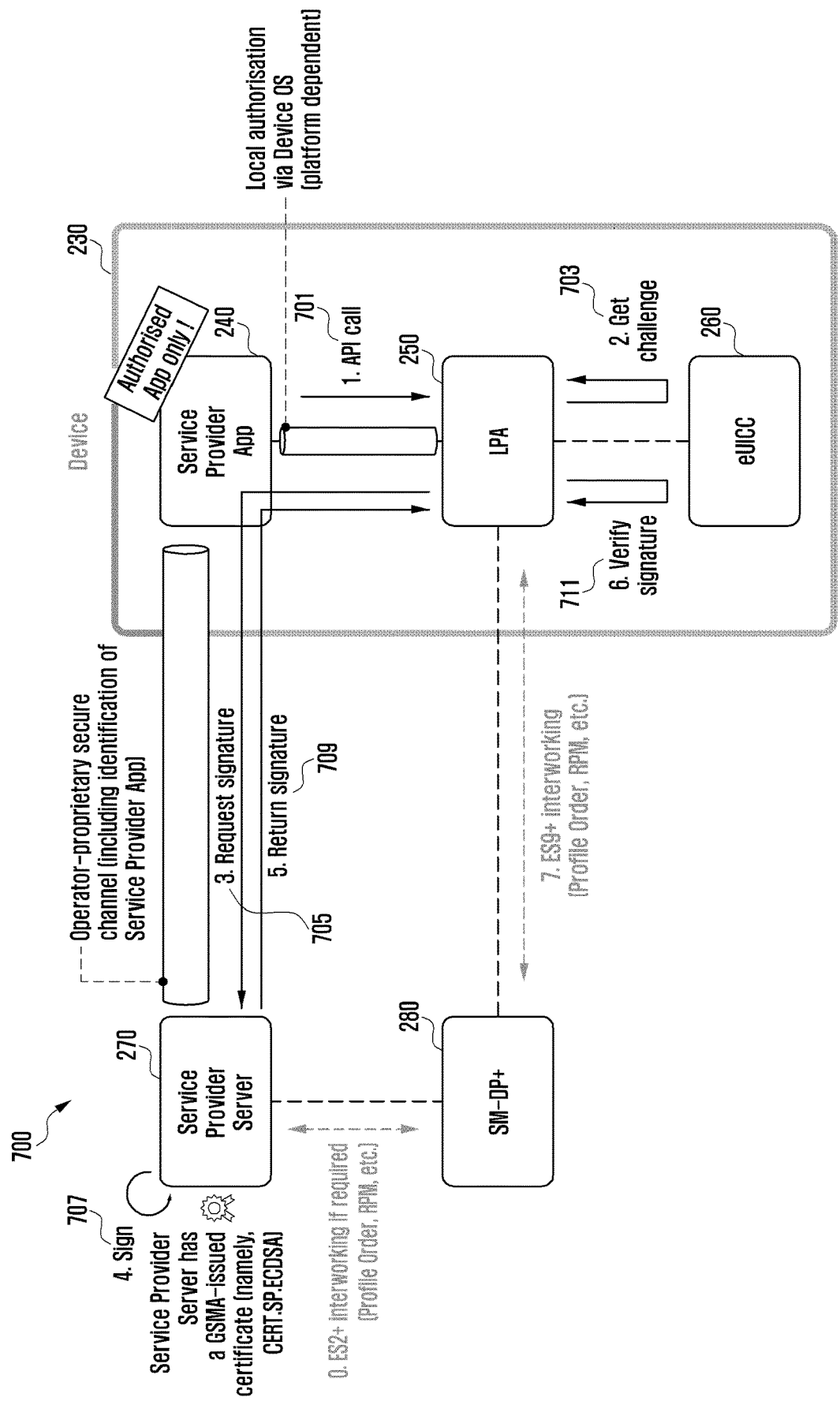
FIG. 7 illustrates a procedure in which an LPA receives help from an eUICC in an online authentication method in which the LPA accesses a service provider server through a service provider app according to an embodiment.

FIG. 7 illustrates an online authentication procedure in which an LPA receives help from an eUICC, when the LPA identifies a service provider app by accessing a service provider server through the service provider app, according to an embodiment (700).

Referring to FIG. 7, at step 701, the service provider app 240 attempts to call a specific function of the LPA 250. The corresponding access may be transferred to the LPA 250 through the offline authentication at step 301 of FIG. 3, and may use the function provided by the terminal 230 as described above with reference to FIG. 2A.

At step 703, the LPA 250 requests an eUICC 260 to generate a challenge, and the eUICC 260 generates and sends the generated challenge to the LPA 250 as a reply.

At step 705, the LPA 250 transfers the received challenge to the service provider server 270 through the service provider app 240 to request a digital signature. An address of the service provider server 270 may be preset in the service provider app 240 or the LPA 250, or may be input from the user.

At step 707, the service provider server 270 performs a digital signature with respect to the received challenge. The digital signature may be performed using a digital certificate pre-stored in the service provider server 270 and a corresponding secret key.

At step 709, the service provider server 270 sends the generated digital signature to the LPA 250 through the service provider app 240 as a reply. The reply may include the digital signature and one or more digital certificates for verifying the digital signature.

At step 711, the LPA 250 transfers the received digital signature to the eUICC 260 in order to request verification of the digital signature. The eUICC 260 may send the verification result of the digital signature to the LPA 250 as a reply. If the digital signature verification through the eUICC 260 has succeeded, the LPA 250 considers that the access authority of the service provider app 240 has been approved, performs the function called by the service provider app 240 (e.g., a profile download from the profile server), and notifies the service provider app 240 or the service provider server 270 of the result of performing the function.

Figure 8:
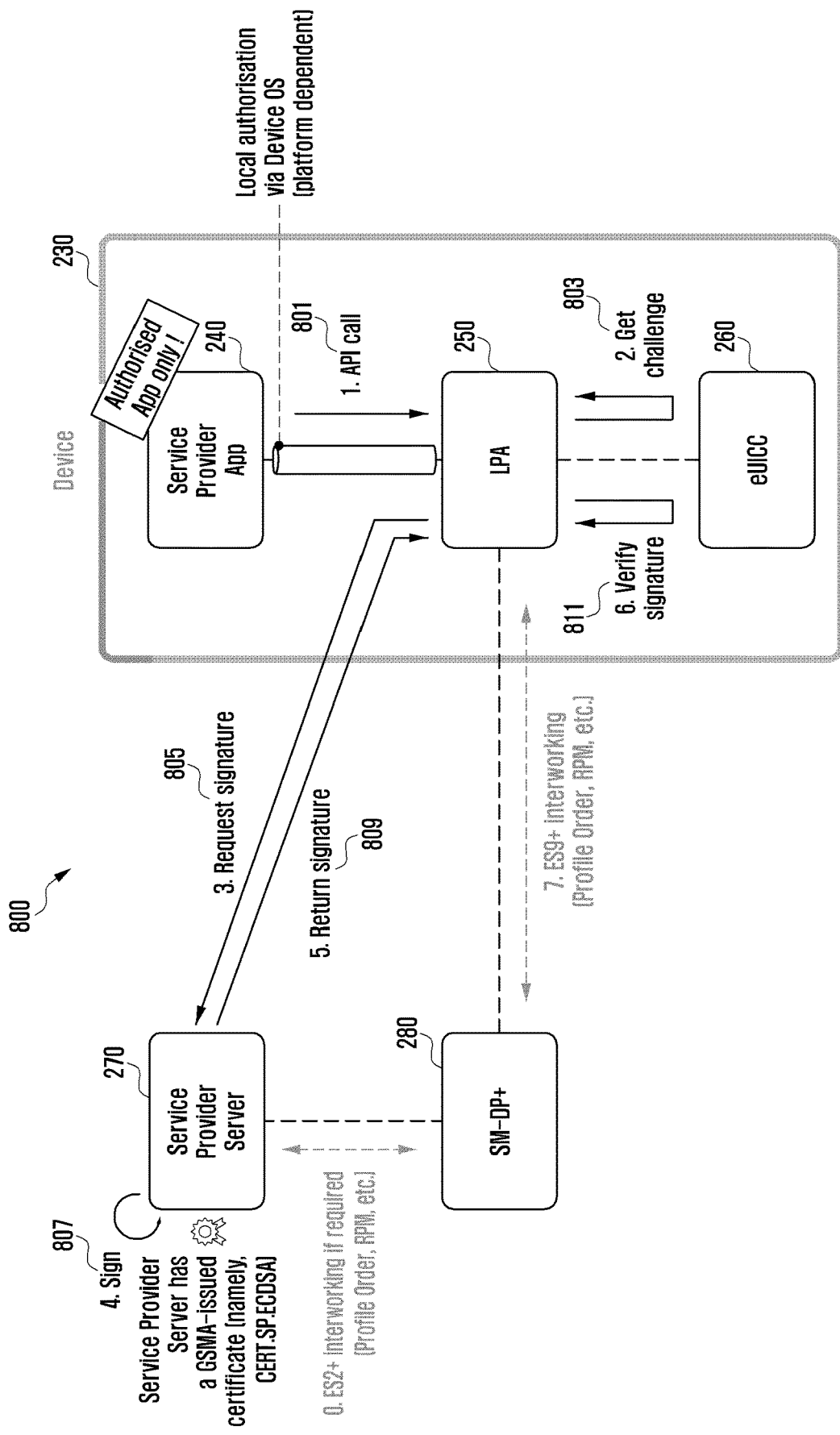
FIG. 8 illustrates a procedure in which an LPA receives help from an eUICC in an online authentication method in which the LPA directly accesses a service provider server according to an embodiment.

FIG. 8 illustrates an online authentication procedure in which an LPA receives help from an eUICC, when the LPA identifies a service provider app by directly accessing a service provider server, according to an embodiment (800).

Referring to FIG. 8, at step 801, the service provider app 240 attempts to call a specific function of the LPA 250. The corresponding access may be transferred to the LPA 250 through the offline authentication at step 301 of FIG. 3, and may use the function provided by the terminal 230 as described above with reference to FIG. 2A.

At step 803, the LPA 250 requests an eUICC 260 to generate a challenge. The eUICC may generate and send the generated challenge to the LPA 250 as a reply.

At step 805, the LPA 250 directly transfers the received challenge to the service provider server 270 in order to request a digital signature. An address of the service provider server 270 may be preset in the LPA 250, may be transferred from the service provider app 240 at step 801, or may be input from the user.

At step 807, the service provider server 270 performs a digital signature with respect to the received challenge. The digital signature may be performed using a digital certificate pre-stored in the service provider server 270 and a corresponding secret key.

At step 809, the service provider server 270 directly sends the generated digital signature to the LPA 250 as a reply. The reply may include the digital signature and one or more digital certificates for verifying the digital signature.

At step 811, the LPA 250 transfers the received digital signature to the eUICC 260 in order to request verification of the digital signature. The eUICC 260 may send the verification result of the digital signature to the LPA 250 as a reply. If the digital signature verification through the eUICC 260 has succeeded, the LPA 250 considers that the access authority of the service provider app 240 has been approved, performs the function called by the service provider app 240 (e.g., a profile download from the profile server), and notifies the service provider app 240 or the service provider server 270 of the result of performing the function.

Figure 9:
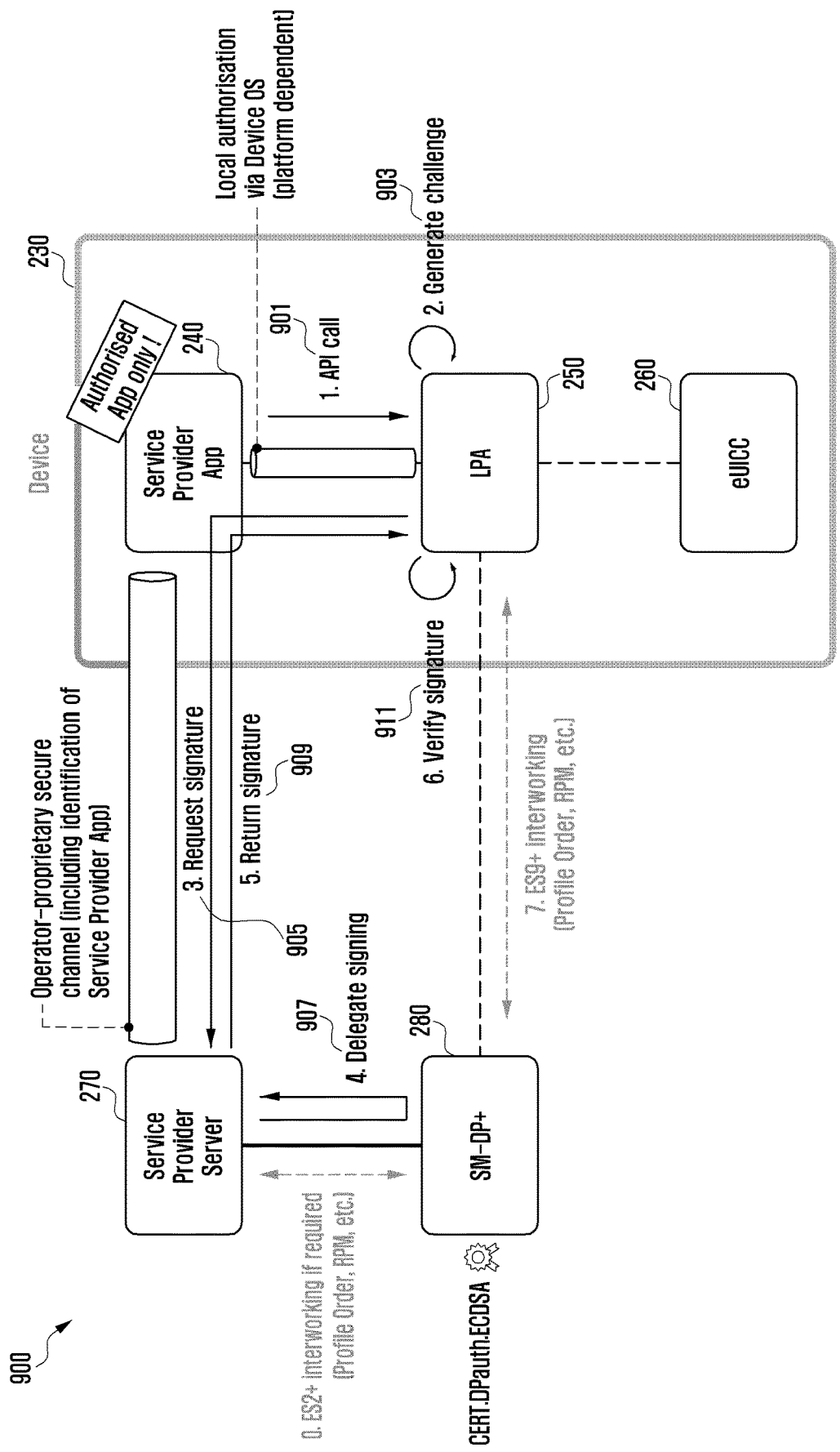
FIG. 9 illustrates a procedure in which an LPA receives help from a profile server in an online authentication method in which the LPA accesses a service provider server through a service provider app according to an embodiment.

FIG. 9 illustrates an online authentication procedure in which an LPA receives help from a profile server, when the LPA identifies a service provider app by accessing a service provider server through the service provider app, according to an embodiment (900).

Referring to FIG. 9, at step 901, the service provider app 240 attempts to call a specific function of the LPA 250. The corresponding access may be transferred to the LPA 250 through the offline authentication at step 301 of FIG. 3, and may use the function provided by the terminal 230 as described above with reference to FIG. 2A.

At step 903, the LPA 250 generates a challenge.

At step 905, the LPA 250 transfers the generated challenge to the service provider server 270 through the service provider app 240 to request a digital signature. An address of the service provider server 270 may be preset in the service provider app 240 or the LPA 250, or may be input from the user.

At step 907, the service provider server 270 obtains a digital signature of the profile server 280 by transferring the received challenge to the profile server 280. An address of the profile server 280 may be preset in the service provider server 270. The digital signature may be performed using a digital certificate pre-stored in the profile server 280 and a corresponding secret key.

At step 909, the service provider server 270 sends the generated digital signature to the LPA 250 through the service provider app 240 as a reply. The reply may include the digital signature and one or more digital certificates for verifying the digital signature.

At step 911, the LPA 250 attempts to verify the received digital signature. If the digital signature verification has succeeded, the LPA 250 considers that the access authority of the service provider app 240 has been approved, performs the function called by the service provider app 240 (e.g., a profile download from the profile server), and notifies the service provider app 240 or the service provider server 270 of the result of performing the function.

Figure 10:
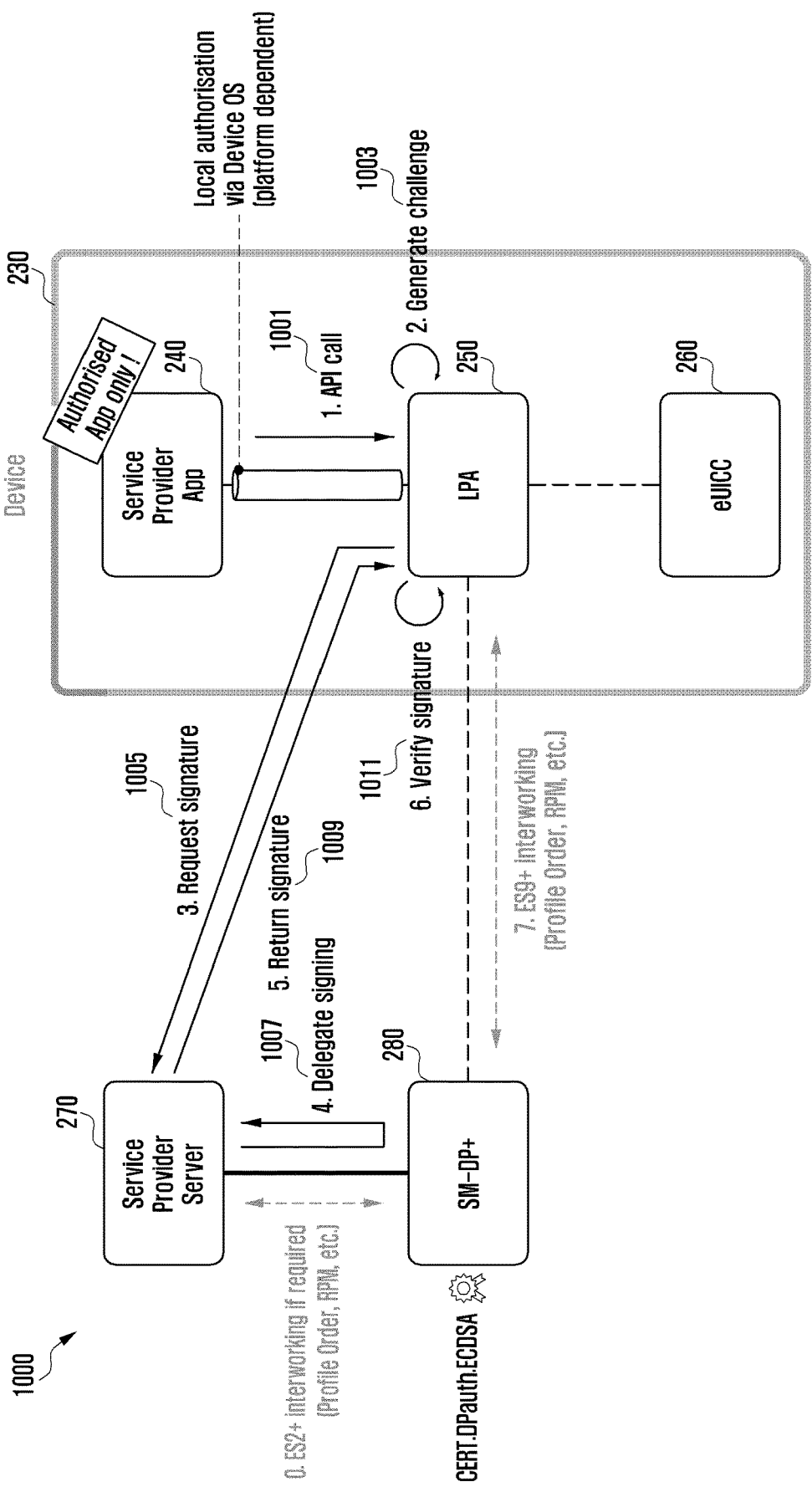
FIG. 10 illustrates a procedure in which an LPA receives help from a profile server in an online authentication method in which the LPA directly accesses a service provider server according to an embodiment.

FIG. 10 illustrates an online authentication procedure in which an LPA receives help from a profile server, when the LPA identifies a service provider app by directly accessing a service provider server, according to an embodiment (1000).

Referring to FIG. 10, at step 1001, the service provider app 240 attempts to call a specific function of the LPA 250. The corresponding access may be transferred to the LPA 250 through the offline authentication at step 301 of FIG. 3, and may use the function provided by the terminal 230 as described above with reference to FIG. 2A.

At step 1003, the LPA 250 generates a challenge.

At step 1005, the LPA 250 directly transfers the generated challenge to the service provider server 270 in order to request a digital signature. An address of the service provider server 270 may be preset in the LPA 250, may be transferred from the service provider app 240 at step 1001, or may be input from the user.

At step 1007, the service provider server 270 obtains a digital signature of the profile server 280 by transferring the received challenge to the profile server 280. An address of the profile server 280 may be preset in the service provider server 270. The digital signature may be performed using a digital certificate pre-stored in the profile server 280 and a corresponding secret key.

At step 1009, the service provider server 270 sends the generated digital signature directly to the LPA 250 as a reply. The reply may include the digital signature and one or more digital certificates for verifying the digital signature.

At step 1011, the LPA 250 attempts to verify the received digital signature. If the digital signature verification has succeeded, the LPA 250 considers that the access authority of the service provider app 240 has been approved, performs the function called by the service provider app 240 (e.g., a profile download from the profile server), and notifies the service provider app 240 or the service provider server 270 of the result of performing the function.

Figure 11:
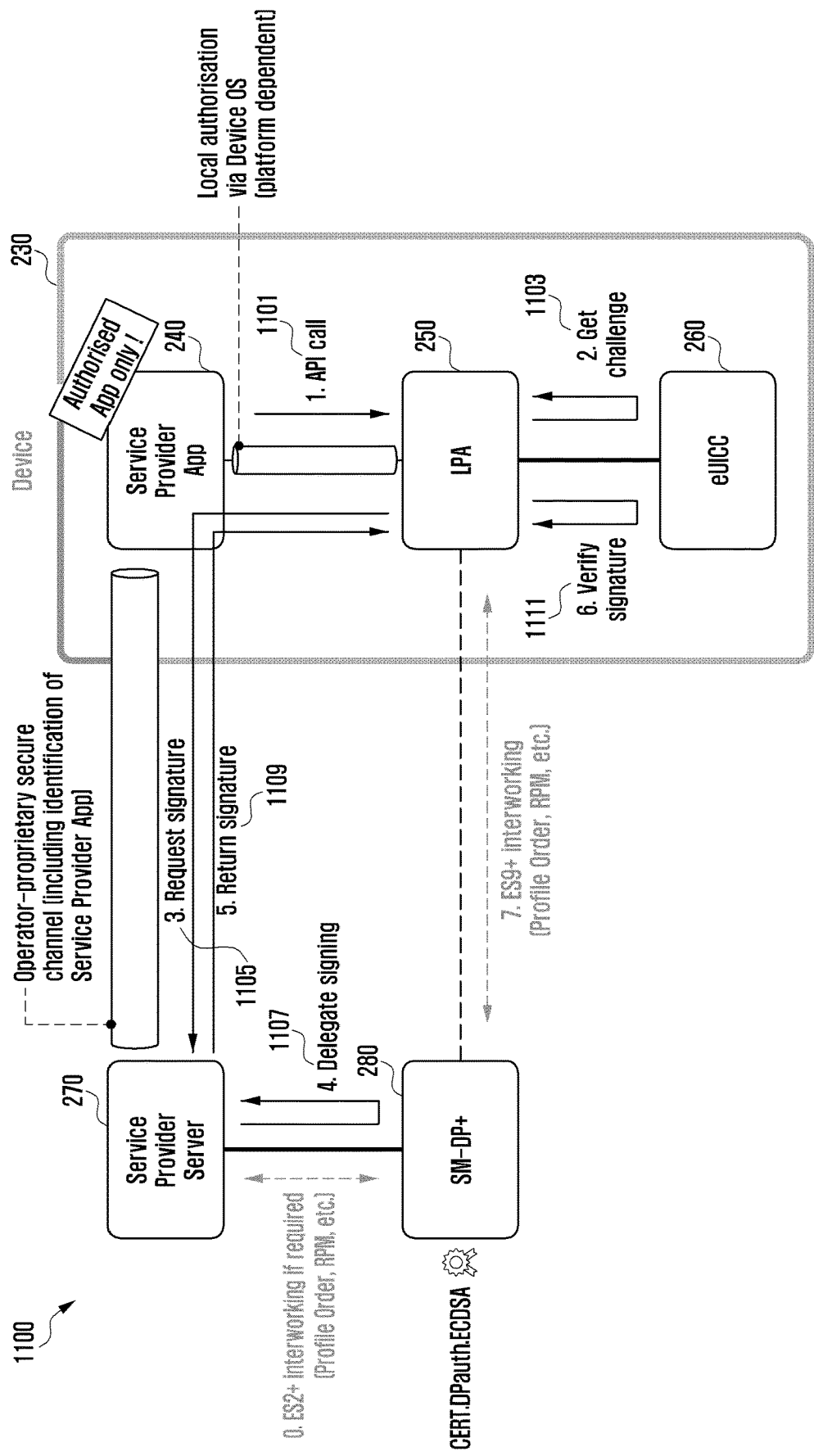
FIG. 11 illustrates a procedure in which an LPA receives help from an eUICC and a profile server in an online authentication method in which the LPA accesses a service provider server through a service provider app according to an embodiment.

FIG. 11 illustrates an online authentication procedure in which an LPA receives help from an eUICC and a profile server, when the LPA identifies a service provider app by accessing a service provider server through the service provider app, according to an embodiment (1100).

Referring to FIG. 11, at step 1101, the service provider app 240 attempts to call a specific function of the LPA 250. The corresponding access may be transferred to the LPA 250 through the offline authentication at step 301 of FIG. 3, and may use the function provided by the terminal 230 as described above with reference to FIG. 2A.

At step 1103, the LPA 250 may request an eUICC 260 to generate a challenge. The eUICC 260 may generate and send the generated challenge to the LPA 250 as a reply.

At step 1105, the LPA 250 may transfer the received challenge to the service provider server 270 through the service provider app 240 in order to request a digital signature. An address of the service provider server 270 may be preset in the service provider app 240 or the LPA 250, or may be input from the user.

At step 1107, the service provider server 270 transfers the received challenge to the profile server 280 in order to obtain a digital signature of the profile server 280. An address of the profile server 280 may be preset in the service provider server 270. The digital signature may be performed using a digital certificate pre-stored in the profile server 280 and a corresponding secret key.

At step 1109, the service provider server 270 sends the generated digital signature to the LPA 250 through the service provider app 240 as a reply. The reply may include the digital signature and one or more digital certificates for verifying the digital signature.

At step 1111, the LPA 250 transfers the received digital signature to the eUICC 260 in order to request verification of the digital signature. The eUICC 260 may send the verification result of the digital signature to the LPA 250 as a reply. If the digital signature verification through the eUICC 260 has succeeded, the LPA 250 considers that the access authority of the service provider app 240 has been approved, performs the function called by the service provider app 240 (e.g., a profile download from the profile server), and notifies the service provider app 240 or the service provider server 270 of the result of performing the function.

Figure 12:
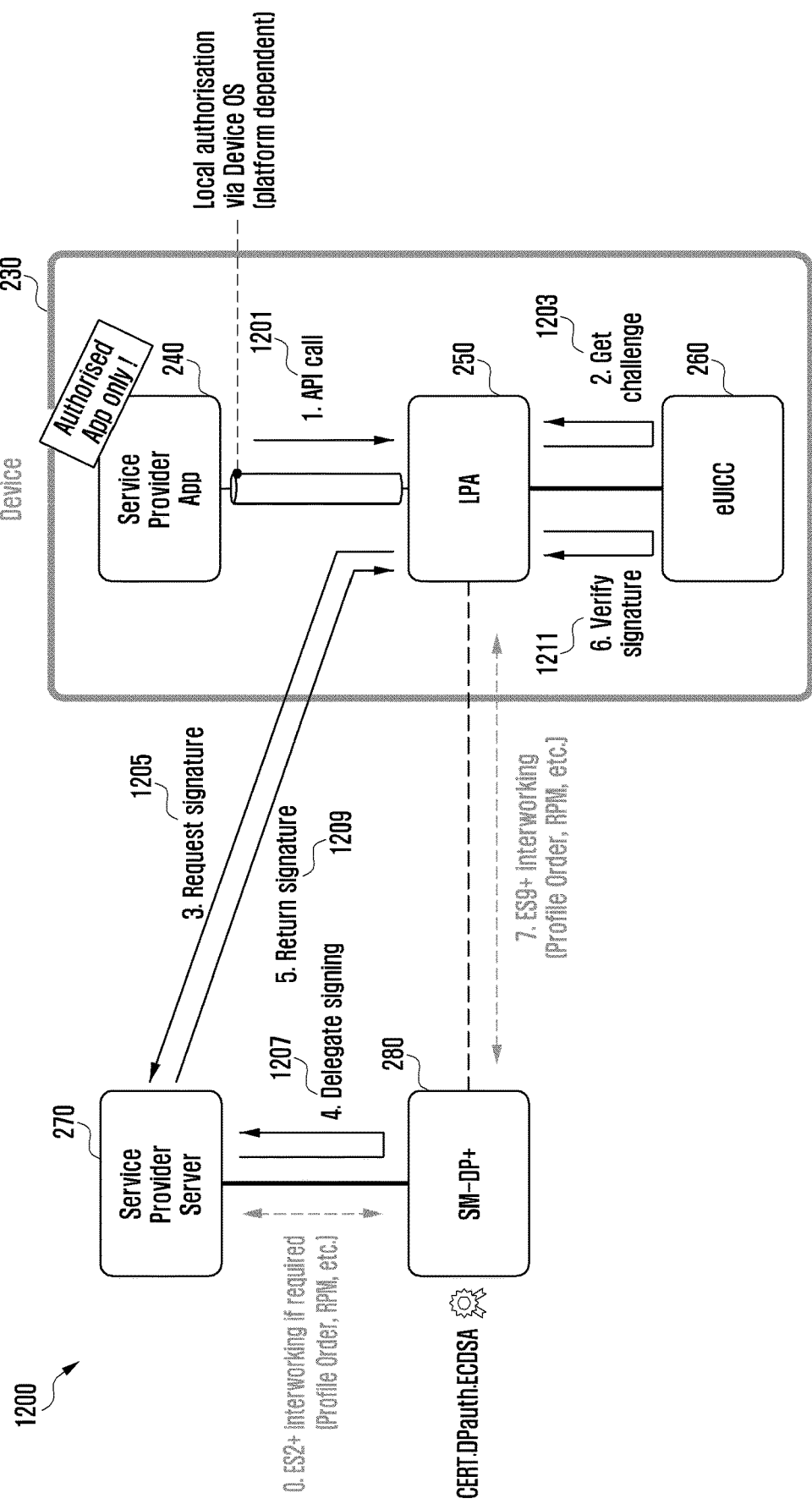
FIG. 12 illustrates a procedure in which an LPA receives help from an eUICC and a profile server in an online authentication method in which the LPA directly accesses a service provider server according to an embodiment.

FIG. 12 illustrates an online authentication procedure in which an LPA receives help from an eUICC and a profile server, when the LPA identifies a service provider app by directly accessing a service provider server, according to an embodiment (1200).

Referring to FIG. 12, at step 1201, the service provider app 240 attempts to call a specific function of the LPA 250. The corresponding access may be transferred to the LPA 250 through the offline authentication at step 301 of FIG. 3, and may use the function provided by the terminal 230 as described above with reference to FIG. 2A.

At step 1203, the LPA 250 requests the eUICC 260 to generate a challenge. The eUICC 260 may generate and send the generated challenge to the LPA 250 as a reply.

At step 1205, the LPA 250 directly transfers the received challenge to the service provider server 270 in order to request a digital signature. An address of the service provider server 270 may be preset in the LPA 250, may be transferred from the service provider app 240 at operation 1201, or may be input from the user.

At step 1207, the service provider server 270 transfers the received challenge to the profile server 280 in order to obtain a digital signature of the profile server 280. An address of the profile server 280 may be preset in the service provider server 270. The digital signature may be performed using a digital certificate pre-stored in the profile server 280 and a corresponding secret key.

At step 1209, the service provider server 270 directly sends the generated digital signature to the LPA 250 as a reply. The reply may include the digital signature and one or more digital certificates for verifying the digital signature.

At step 1211, the LPA 250 transfers the received digital signature to the eUICC 260 in order to request verification of the digital signature. The eUICC 260 may send the verification result of the digital signature to the LPA 250 as a reply. If the digital signature verification through the eUICC 260 has succeeded, the LPA 250 considers that the access authority of the service provider app 240 has been approved, performs the function called by the service provider app 240 (e.g., a profile download from the profile server), and notifies the service provider app 240 or the service provider server 270 of the result of performing the function.

Figure 13:
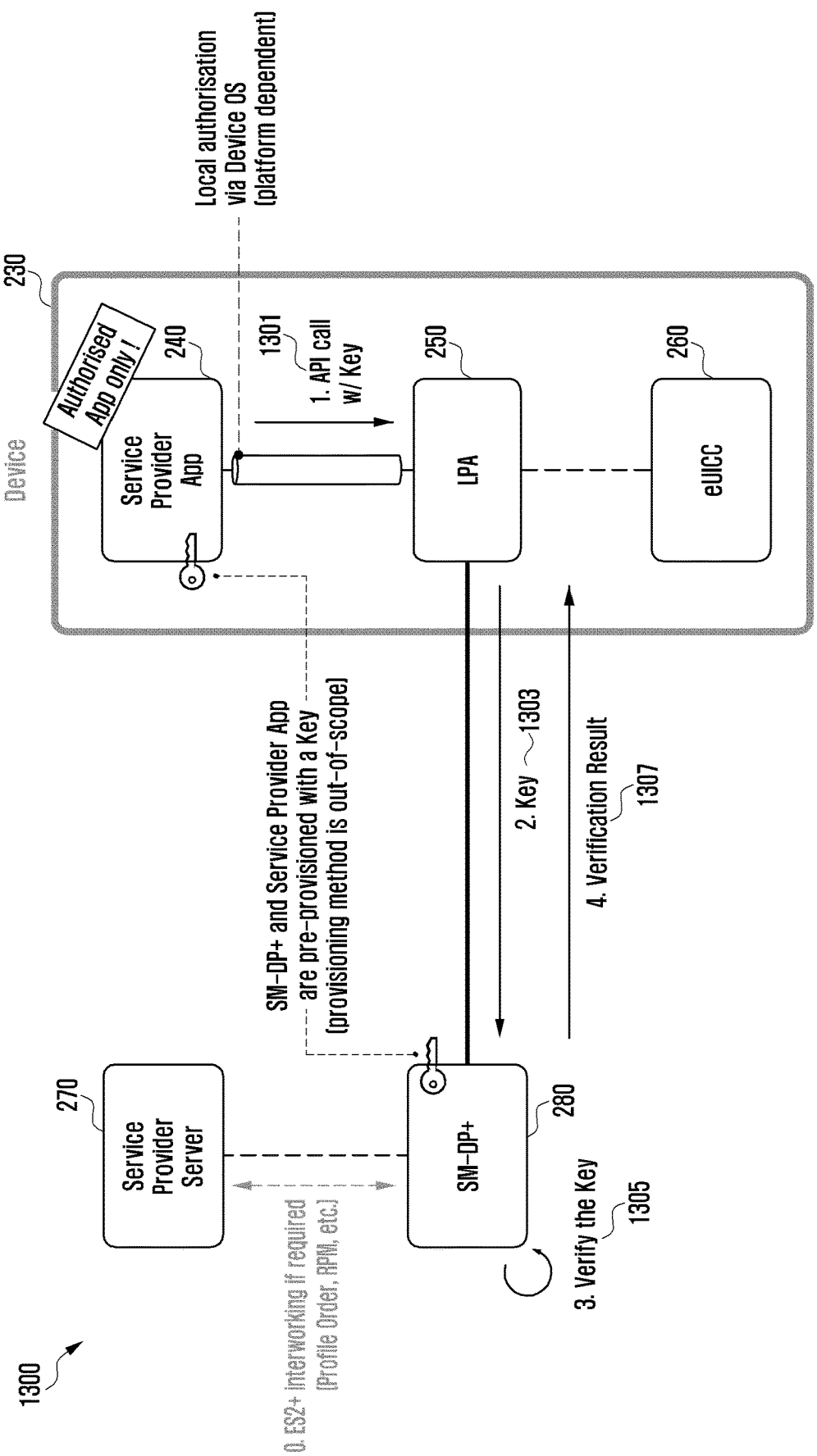
FIG. 13 illustrates a procedure in which an LPA uses a key pre-shared in a service provider app and a profile server in an online authentication method in which the LPA accesses the profile server according to an embodiment.

FIG. 13 illustrates an online authentication procedure in which an LPA uses a key pre-shared in a service provider app and a profile server, when the LPA identifies the service provider app, according to an embodiment (1300).

Referring to FIG. 13, the service provider server 270 may store the same key in the service provider app 240 and the profile server 280.

At step 1301, when attempting to call a specific function of the LPA 250, the service provider app 240 transfers a key included in the service provider app 240 and an operation result using the corresponding key. The corresponding access may be transferred to the LPA 250 through the offline authentication at step 301 of FIG. 3, and may use the function provided by the terminal 230 as described above with reference to FIG. 2A.

At step 1303, the LPA 250 transfers, to the profile server 280, the key received and the operation result using the corresponding key. An address of the profile server 280 may be pre-stored in the LPA 250, may be transferred from the service provider app 240 at step 1301, or may be input from the user.

At step 1305, the profile server 280 may verify the received key or the operation result using the corresponding key using the key stored in the profile server 280.

At step 1307, the profile server 280 sends the verification result to the LPA 250 as a reply. If the verification result has succeeded, the LPA 250 considers that the access authority of the service provider app 240 has been approved, performs the function called by the service provider app 240 (e.g., a profile download from the profile server), and notifies the service provider app 240 or the service provider server 270 of the result of performing the function.

Figure 14:
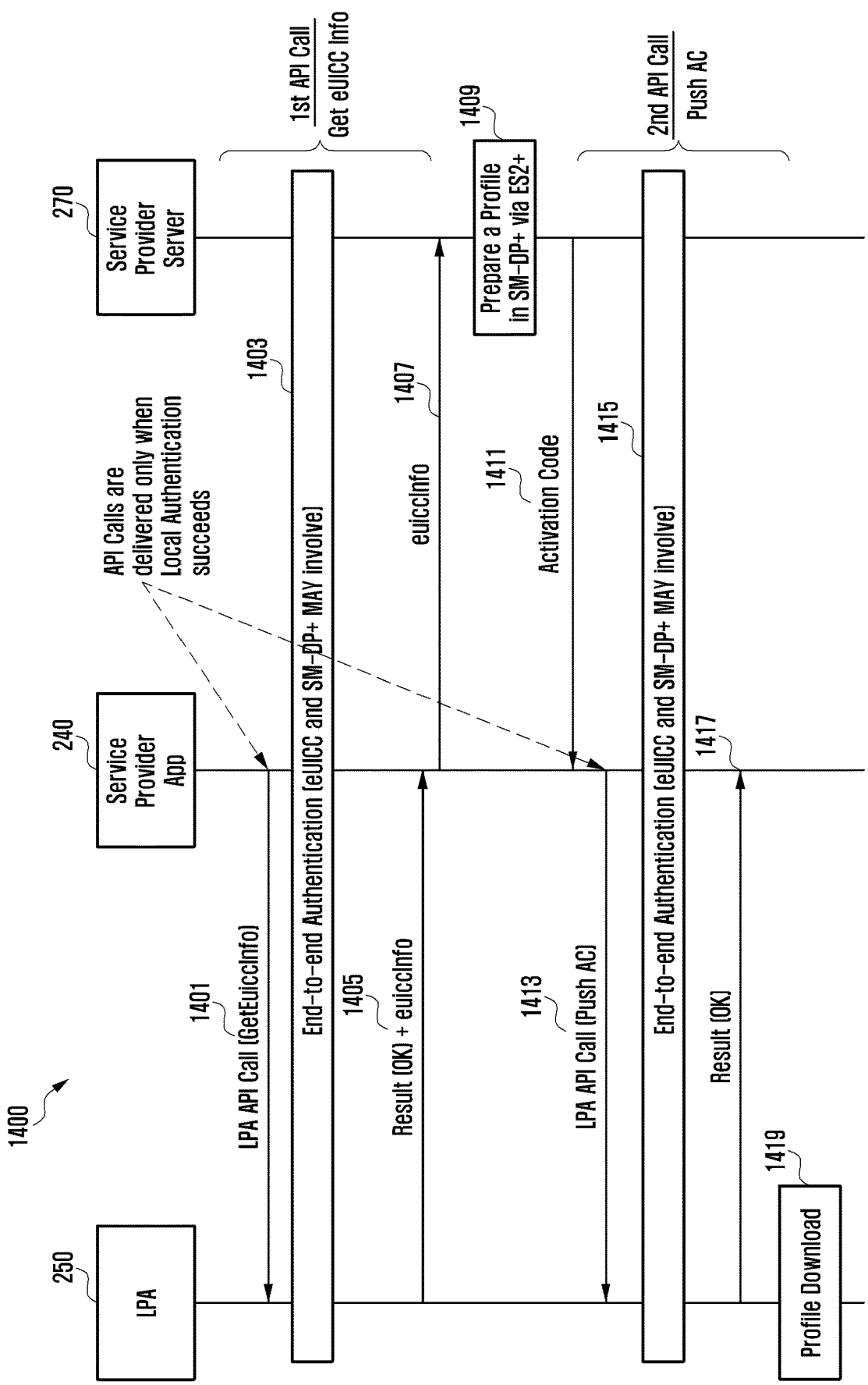
FIG. 14 illustrates a procedure in which a service provider app performs online authentication with respect to all LPA function calls twice, if the service provider app downloads a profile through the LPA function calls twice, according to an embodiment.

FIG. 14 illustrates a method in which a service provider app allows an LPA to download a profile by successively calling two specific functions of the LPA, according to an embodiment (1400).

Referring to FIG. 14, at step 1401, the service provider app 240 transfers a "Get eUICC Info" message to the LPA 250 as a first LPA function call. The "Get eUICC Info" message of step 1401 may be transferred to the LPA 250 through the offline authentication at step 301 of FIG. 3, and may use the function provided by the terminal 230 as described above with reference to FIG. 2A.

At step 1403, the LPA 250 verifies the access authority of the service provider app 240 online through the service provider server 270, e.g., according to one of the methods illustrated in FIGS. 5 to 13. Further, although not illustrated in FIG. 14, the eUICC 260 and/or the profile server 280 may be included in the online authentication procedure according to circumstances, as illustrated in the FIGS. 5 to 13.

At step 1405, the LPA 250 notifies the service provider app 240 of the online authentication result. In case of the "Get eUICC Info", which is the first LPA function call according to this embodiment, the corresponding online authentication result may be transferred with eUICC Info that the LPA 250 has read from the eUICC 260.

At step 1407, the service provider app 240 transfers the received eUICC Info to the service provider server 270.

At step 1409, the service provider server 270 prepares a profile to be installed in the eUICC based on the received eUICC Info. The preparation of the profile may be performed in association with the specific profile server 280, and as the result of the profile preparation, an activation code for downloading the corresponding profile may be generated.

At step 1411, the service provider server 270 sends the generated activation code to the service provider app 240 as a reply.

In order to transfer the received activation code to the LPA 250, the service provider app 240, at step 1413, transfers a "Push Activation Code" message to the LPA 250 as a second LPA function call. The "Push Activation Code" message of step 1413 may pass through the same offline authentication as that described above at step 1401.

At step 1415, the LPA 250 re-perform the same online authentication as performed at step 1403. Further, the online authentication procedure at step 1415 with respect to the "Push Activation Code" message may include a procedure of identifying the integrity of the corresponding activation code by transferring, to the service provider server 240, the activation code received at step 1413 with the challenge, e.g. according to the embodiments illustrated in FIGS. 5 to 13, and requesting a digital signature.

At step 1417, the LPA 250 notifies the service provider app 240 of the online authentication result. In case of the "Push Activation Code", which is the second LPA function call according to this embodiment, the corresponding online authentication result may be sent as a reply, after the profile at step 1419 is installed.

At step 1419, the LPA 250 downloads and installs the profile from the profile server 280 using the activation code received at step 1413.

Figure 15:
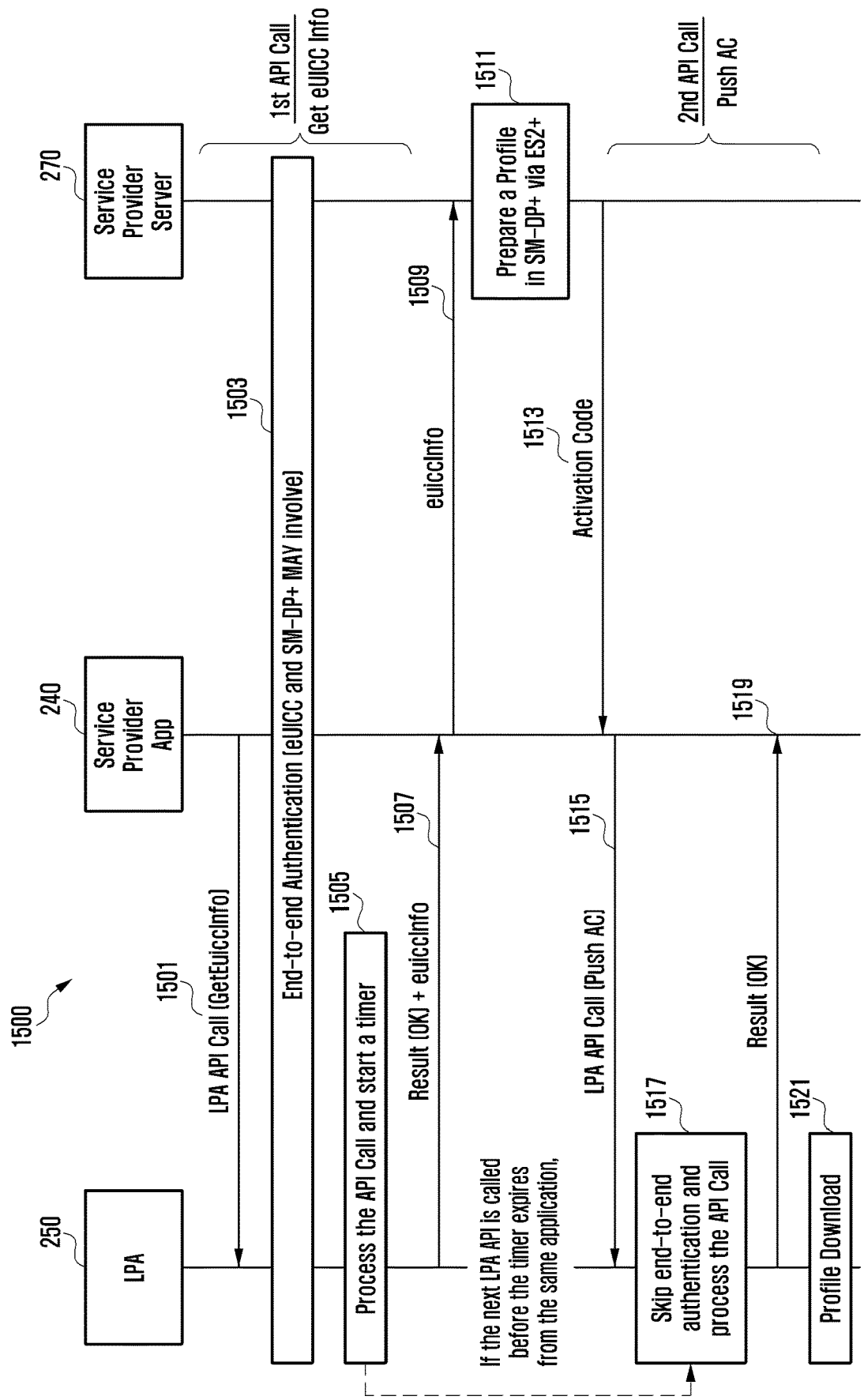
FIG. 15 illustrates a procedure in which a service provider app omits online authentication using a timer with respect to the second LPA function call, if the service provider app downloads a profile through LPA function calls twice, according to an embodiment.

FIG. 15 illustrates a method in which a service provider app replaces an online authentication by a timer operation with respect to a second access, when it successively calls two specific functions of the LPA, according to an embodiment (1500).

Referring to FIG. 15, at step 1501, the service provider app 240 transfers a "Get eUICC Info" message to the LPA 250 as a first LPA function call. The "Get eUICC Info" message of step 1501 may be transferred to the LPA 250 through the offline authentication at step 301 of FIG. 3, and may use the function provided by the terminal 230 as described above with reference to FIG. 2A.

At step 1503, the LPA 250 verifies the access authority of the service provider app 240 online through the service provider server 270, e.g., according to one of the embodiments of FIGS. 5 to 13. Further, although not illustrated in FIG. 15, the eUICC 260 and/or the profile server 280 may be included in the online authentication procedure according to circumstances, as illustrated in FIGS. 5 to 13.

If the online authentication at step 1503 has succeeded, the LPA 250, at step 1505, may operates a timer in order to simplify the access authority verification during a second LPA function call of the corresponding service provider app 240.

At step 1507, the LPA 250 notifies the service provider app 240 of the online authentication result. In case of the "Get eUICC Info", which is the first LPA function call according to this embodiment, the corresponding online authentication result may be transferred together with eUICC Info that the LPA 250 has read from the eUICC 260.

The operations at steps 1507 to 1513 are the same as steps 1405 to 1411 of FIG. 14. Accordingly, a repetitive description of the steps is omitted.

In order to transfer the activation code received at step 1513 to the LPA 250, the service provider app 240, at step 1515, transfers a "Push Activation Code" message to the LPA 250 as a second LPA function call. The "Push Activation Code" message of step 1515 may pass through the same offline authentication as that described above at step 1501.

At step 1517, the LPA 250 identifies whether the second LPA function call is caused by the same service provider app 240, and whether it is made before the timer operated at step 1505 expires. If the same service provider app 240 calls the function of the LPA 250 for the second time, before the timer expires, the LPA 250 may consider that an access of the corresponding service provider app 240 has been permitted, and may omit performing the online authentication procedure.

At step 1519, the LPA 250 notifies the service provider app 240 of the result of the identification at step 1517. In FIG. 15, although the online authentication procedure is omitted, like the embodiment of FIG. 14, the online verification of the second LPA function call may not be inevitably distinguished from the result of the reply. Therefore, if needed, the LPA 250, at step 1519, may operate an additional timer or may extend the operation time of the previous timer against a third LPA function call or the subsequent LPA function call. Further, in case of the "Push Activation Code", which is the second LPA function call according to this embodiment, the corresponding online authentication result may be sent as a reply after the profile at step 1521 is installed.

At step 1521, the LPA 250 downloads and installs the profile from the profile server 280 using the activation code received at step 1515.

Figure 16:
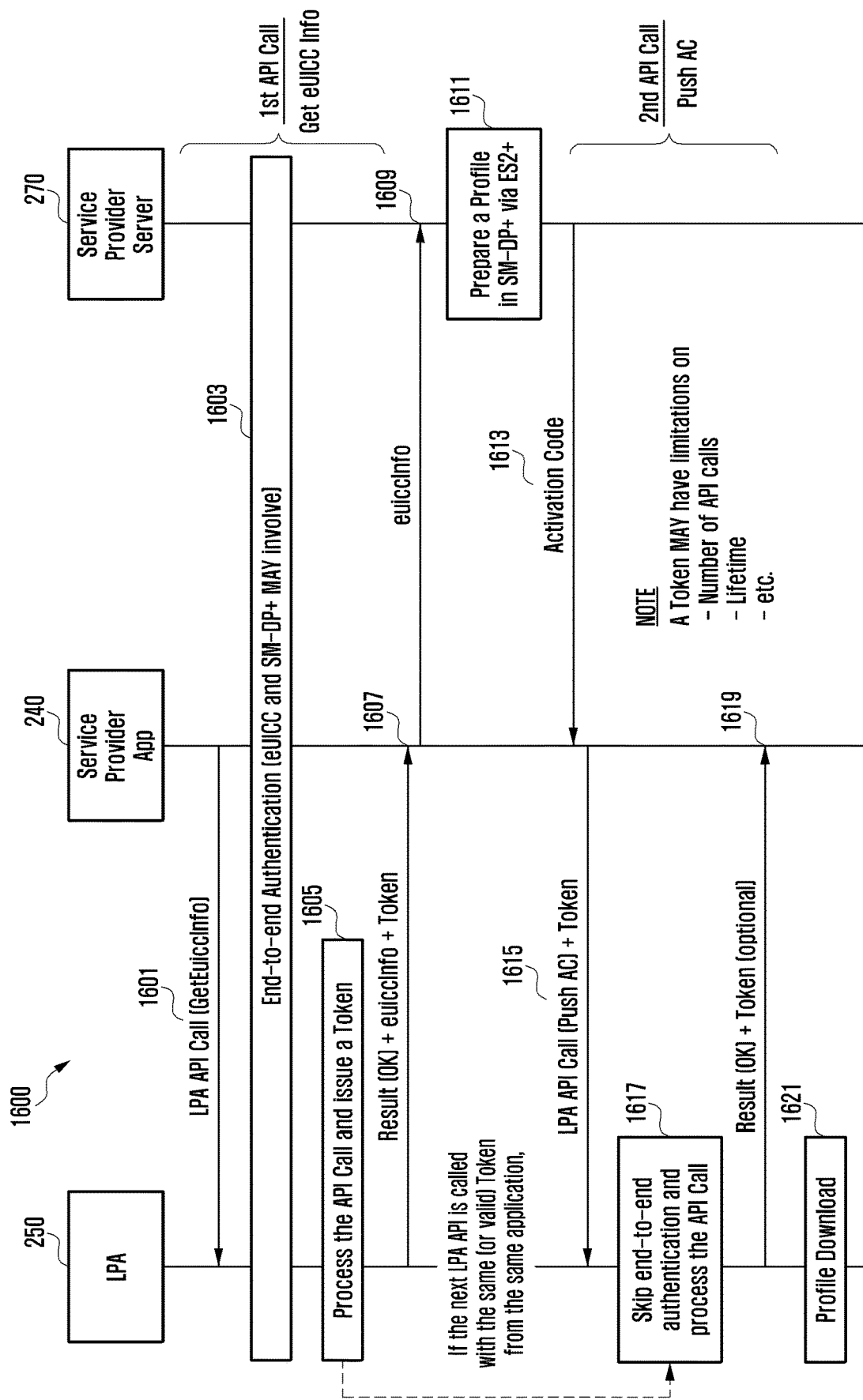
FIG. 16 illustrates a procedure in which a service provider app omits online authentication using a token with respect to the second LPA function call, if the service provider app downloads a profile through LPA function calls twice, according to an embodiment.

FIG. 16 illustrates a method in which a service provider app replaces an online authentication by a token verification with respect to a second access, when it successively calls two of specific functions of the LPA, according to an embodiment (1600).

Referring to FIG. 16, at step 1601, the service provider app 240 transfers a "Get eUICC Info" message to the LPA 250 as a first LPA function call. The "Get eUICC Info" message of step 1601 may be transferred to the LPA 250 through the offline authentication at step 301 of FIG. 3, and may use the function provided by the terminal 230 as described above with reference to FIG. 2A.

At step 1603, the LPA 250 verifies the access authority of the service provider app 240 online through the service provider server 270, e.g., according to one of the embodiments of FIGS. 5 to 13. Further, although not illustrated in FIG. 16, the eUICC 260 and/or the profile server 280 may be included in the online authentication procedure according to circumstances, as illustrated in FIGS. 5 to 13.

If the online authentication at step 1603 has succeeded, the LPA 250, at step 1605, issues a token in order to simplify the access authority verification during a second LPA function call of the corresponding service provider app 240. The token may be used with restriction in validity such as in the following list, but such restriction is not limited thereto.

Usable number of times
Lifetime

At step 1607, the LPA 250 notifies the service provider app 240 of the online authentication result at step 1603. In case of the "Get eUICC Info", which is the first LPA function call according to this embodiment, the corresponding online authentication result may be transferred together with eUICC Info that the LPA 250 has read from the eUICC 260. Further, at step 1607, the LPA 250 may also transfer the token issued at step 1605 to the service provider app 240.

The operations at steps 1607 to 1613 are the same as steps 1405 to 1411 of FIG. 14, and therefore, a repetitive description of the steps is omitted.

In order to transfer the activation code received at step 1613 to the LPA 250, the service provider app 240, at step 1615, transfers a "Push Activation Code" message to the LPA 250 as a second LPA function call. At step 1615, the service provider app 240 may also transfer the token received at step 1607 to the LPA 250. "The Push Activation Code" message of step 1615 may pass through the same offline authentication as that described above at step 1601.

At step 1617, the LPA 250 identifies whether the second LPA function call at step 1615 is caused by the same service provider app 240, and whether the token received at step 1615 is valid by comparing it with the token issued at step 1605. If the same service provider app 240 calls the function of the LPA 250 for the second time using the valid token, the LPA 250 may consider that an access of the corresponding service provider app 240 has been permitted, and may omit the online authentication procedure.

At step 1619, the LPA 250 notifies the service provider app 240 of the result of the identification at step 1617. In FIG. 16, although the online authentication procedure is omitted, like the embodiment of FIG. 14, the online verification of the second LPA function call may not be inevitably distinguished from the result of the reply. Therefore, if needed, the LPA 250, at step 1619, may issue a new token or may update the validity of the previously issued token against a third LPA function call or the subsequent LPA function call. Further, in case of the "Push Activation Code", which is the second LPA function call according to this embodiment, the corresponding online authentication result may be sent as a reply after the profile at step 1621 is installed.

At step 1621, the LPA 250 downloads and installs the profile from the profile server 280 using the activation code received at step 1613.

Figure 17:
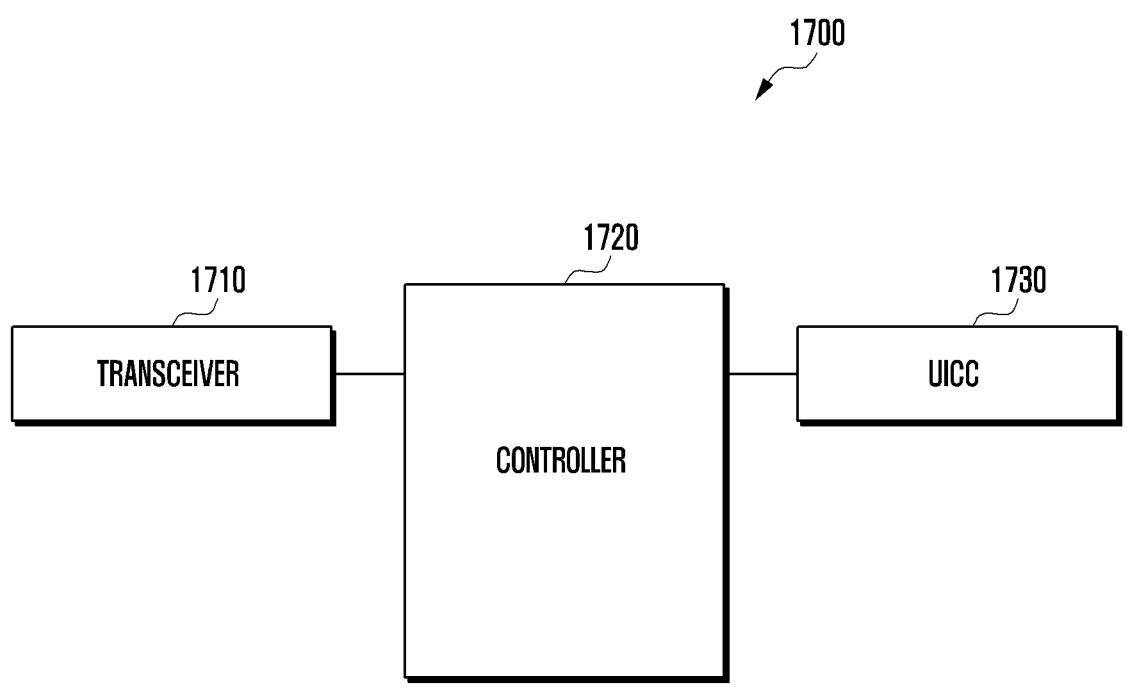
FIG. 17 illustrates a terminal according to an embodiment.

FIG. 17 illustrates a terminal according to an embodiment.

Referring to FIG. 17, a terminal 1700 includes a transceiver 1710, a controller 1720, and a UICC 1730. The UICC 1730 may be inserted into the terminal 1700, or may be embedded in the terminal 1700.

The transceiver 1710 may transmit and receive signals, information, and data.

The controller 1720 may control the overall operation of the terminal 1700, e.g., according to the methods illustrated in FIGS. 3 to 16.

Further, the UICC 1730 may download a profile and install the downloaded profile. In addition, the UICC 1730 may manage the profile. The UICC 1730 may operate under the control of the controller 1720. Further, the UICC 1730 may include a processor or a controller for installing the profile, or an application may be installed therein.

For example, in a wireless communication system according to an embodiment of the present disclosure, the terminal 1700 may include the controller 1720 for controlling second software to call a function of first software and preparing a signature request message (challenge) for authority verification of the second software, and the transceiver 1710 for transmitting the signature request message to a service provider server to request a digital signature and receiving the digital signature from the service provider server.

Further, the controller 1720 may further include a determination unit for verifying the digital signature using a digital certificate. If the digital signature verification through the service provider server has succeeded, the controller 1720 and the determination unit may omit an additional authority verification of the second software thereafter.

Additionally, the terminal 1700 may include the controller 1720 for controlling an eUICC, and the transceiver 1710 for transmitting a profile request message to a profile server SM-DP+ and receiving a profile downloaded from the profile server.

Figure 18:
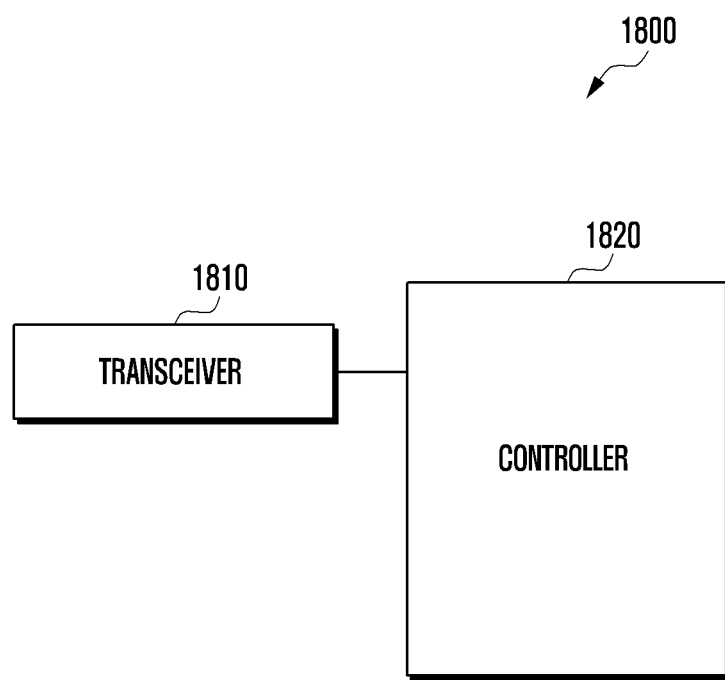
FIG. 18 illustrates a server according to an embodiment.

FIG. 18 illustrates a server according to an embodiment. For example, a server 1800 of FIG. 18 may be a profile server or a service provider server.

Referring to FIG. 18, the server 1800 includes a transceiver 1810 and a controller 1820.

The transceiver 1810 may transmit and receive signals, information, and data. For example, the transceiver 1810 may communicate with a terminal or another server (or network entity) such that it receives a request from the terminal, and transmits a profile and a digital signature to the terminal.

The controller 1820 may control the overall operation of the server 1800, e.g., according to the methods illustrated in FIGS. 3 to 16.

For example, if the server 1800 is a service provider server in a wireless communication system according to an embodiment of the present disclosure, the server 1800 may include the controller 1820 for receiving a signature request message from a terminal or first or second software included in the terminal, determining whether a digital signature can be generated, and generating the digital signature. Further, the server 1800 may transfer the signature request message to a profile server using the controller 1820 and the transceiver 1810, if generation of the digital signature is not possible. The server 1800 may receive the digital signature from the profile server, or may transmit the digital signature to the terminal or the first or second software included in the terminal.

According to the above-described embodiments of the present disclosure, if second software intends to call a function of an LPA, the LPA of a terminal may identify whether the second software is verified software in the terminal, and may identify an access authority of the second software through a network server. Accordingly, the LPA can prevent third unverified software from accessing the LPA, and can notify the network server that the second software intends to access the LPA.

Further, if the second software intends to call the function of the LPA two or more times, the LPA of the terminal may permit the second software to make an access in accordance with the above-described procedure with respect to the initial access, and may omit an access authority identification of the second software through the network server with respect to the accesses two or more times. Accordingly, the LPA can reduce a burden of the access authority verification and can shorten the verification time in the case where successive LPA accesses are requested from the already verified software.

Although various embodiments of the present disclosure have been described above in the specification and drawings, these are merely examples presented to help understanding of the present disclosure, and are not intended to limit the scope of the present disclosure. Accordingly, it will be apparent to those of ordinary skill in the art to which the present disclosure pertains that various modifications can be realized based on the technical concept of the present disclosure.

Further, respective embodiments may be combined to be operated as needed. For example, parts of different embodiments of the present disclosure may be combined to operate a base station and a terminal. Further, although the above-described embodiments are presented based on an LTE/LTE- Advanced (LTE-A) system, other modifications based on the technical concept of the embodiments can be applied to other systems, such as 5G or New Radio (NR) systems.

While the present disclosure has been particularly shown and described with reference to certain embodiments thereof, it will be understood by those of ordinary skill in the art that various changes in form and details may be made therein without departing from the spirit and scope of the present disclosure as defined by the following claims and their equivalents.

What is claimed is:

1. A method performed by an embedded universal integrated circuit card (eUICC) included in a terminal having an application authorized by an operator in a wireless communication system, the method comprising:
   receiving, from a local profile assistant (LPA) installed in the terminal, a first function call associated with a challenge of the eUICC, the first function call being received based on a first request from the application authorized by the operator;
   transmitting, to the LPA, the challenge generated based on the first function call;
   receiving, from the LPA, a second function call associated with a signature of a server, wherein the second function call includes the signature of the server generated for the challenge and is received based on a second request from the application authorized by the operator; and
   receiving, from the LPA, a request for verifying the signature of the server.

2. The method of claim 1, wherein the challenge is delivered from the LPA to the application, and
   wherein a first message including the challenge is transmitted from the application to the server.

3. The method of claim 2, wherein a second message including the signature of the server is received from the server to the application, as a response to the first message, and
   wherein the second request including the signature of the server is transmitted from the application to the LPA based on the second message.

4. The method of claim 1, wherein the signature is generated by the server based on a digital certificate.

5. The method of claim 1, wherein a procedure for downloading a profile is performed based on a result of the verification.

6. A method performed by a terminal including an embedded universal integrated circuit card (eUICC) and having an application authorized by an operator and a local profile assistant (LPA) installed therein in a wireless communication system, the method comprising:
   receiving, from the application by the LPA, a first request for a challenge of the eUICC;
   transmitting, to the eUICC by the LPA, a first function call associated with the challenge of the eUICC;
   receiving, from the eUICC by the LPA, the challenge generated based on the first function call;
   transmitting, to a server by the application, a first message including the challenge;
   receiving, from the server by the application, a second message including a signature of the server generated for the challenge;
   transmitting, to the eUICC by the LPA, a second function call including the signature of the server; and
   receiving, from the LPA, by the eUICC, a request for verifying the signature of the server.

7. The method of claim 6, wherein the challenge is delivered from the LPA to the application.

8. The method of claim 7, wherein the second message is received from the server by the application, as a response to the first message, and
   wherein a second request including the signature of the server is transmitted from the application to the LPA based on the second message.

9. The method of claim 6, wherein the signature is generated by the server based on a digital certificate.

10. The method of claim 6, wherein a procedure for downloading a profile is performed based on a result of the verification.

11. An embedded universal integrated circuit card (eUICC) included in a terminal having an application authorized by an operator in a wireless communication system, the eUICC being configured to:
    receive, from a local profile assistant (LPA) installed in the terminal, a first function call associated with a challenge of the eUICC, the first function call being received based on a first request from the application authorized by the operator,
    transmit, to the LPA, the challenge generated based on the first function call,
    receive, from the LPA, a second function call associated with a signature of a server, wherein the second function call includes the signature of the server generated for the challenge and is received based on a second request from the application authorized by the operator, and
    receive, from the LPA, a request for verifying the signature of the server.

12. The eUICC of claim 11, wherein the challenge is delivered from the LPA to the application, and
    wherein a first message including the challenge is transmitted from the application to the server.

13. The eUICC of claim 12, wherein a second message including the signature of the server is received from the server to the application, as a response to the first message, and
    wherein the second request including the signature of the server is transmitted from the application to the LPA based on the second message.

14. The eUICC of claim 11, wherein the signature is generated by the server based on a digital certificate.

15. The eUICC of claim 11, wherein a procedure for downloading a profile is performed based on a result of the verification.

16. A terminal including an embedded universal integrated circuit card (eUICC), the terminal having an application authorized by an operator and a local profile assistant (LPA) installed therein in a wireless communication system, the terminal comprising:
    a transceiver configured to transmit or receive a signal; and
    a controller configured to:
      receive, from the application by the LPA, a first request for a challenge of the eUICC,
      transmit, to the eUICC by the LPA, a first function call associated with the challenge of the eUICC,
      receive, from the eUICC by the LPA, the challenge generated based on the first function call,
      transmit, to a server by the application, a first message including the challenge,
      receive, from the server by the application, a second message including a signature of the server generated for the challenge, transmit, to the eUICC by the LPA, a second function call including the signature of the server, and receive, from the LPA, by the eUICC, a request for verifying the signature of the server.

17. The terminal of claim 16, wherein the challenge is delivered from the LPA to the application.

18. The terminal of claim 17, wherein the second message is received from the server by the application, as a response to the first message, and wherein a second request including the signature of the server is transmitted from the application to the LPA based on the second message.

19. The terminal of claim 16, wherein the signature is generated by the server based on a digital certificate.

20. The terminal of claim 16, wherein a procedure for downloading a profile is performed based on a result of the verification.

\* \* \* \* \*